(12) United States Patent
Nakamura et al.

(10) Patent No.: US 8,698,830 B2
(45) Date of Patent: Apr. 15, 2014

(54) IMAGE PROCESSING APPARATUS AND METHOD FOR TEXTURE-MAPPING AN IMAGE ONTO A COMPUTER GRAPHICS IMAGE

(75) Inventors: Sensaburo Nakamura, Shizuoka (JP); Norimasa Ozaki, Kanagawa (JP); Takeo Ugai, Kanagawa (JP); Toshimasa Kakihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 316 days.

(21) Appl. No.: 12/830,505

(22) Filed: Jul. 6, 2010

(65) Prior Publication Data

US 2011/0012911 A1 Jan. 20, 2011

(30) Foreign Application Priority Data

Jul. 14, 2009 (JP) ................. P2009-166172

(51) Int. Cl.
*G09G 5/00* (2006.01)
(52) U.S. Cl.
USPC .................................. 345/582; 345/581
(58) Field of Classification Search
USPC .......... 345/419, 420, 581, 589, 582; 706/919, 706/921; 715/961, 964
See application file for complete search history.

(56) References Cited

U.S. PATENT DOCUMENTS

| | | | | |
|---|---|---|---|---|
| 8,466,932 | B2* | 6/2013 | Van De Sluis et al. | 345/595 |
| 2003/0112237 | A1* | 6/2003 | Corbetta | 345/426 |
| 2003/0222875 | A1* | 12/2003 | Kawakami et al. | 345/473 |
| 2004/0052418 | A1* | 3/2004 | DeLean | 382/209 |
| 2004/0061791 | A1* | 4/2004 | Terada | 348/231.2 |
| 2004/0228337 | A1* | 11/2004 | Naoi et al. | 370/360 |
| 2005/0280711 | A1* | 12/2005 | Ishii et al. | 348/207.99 |
| 2006/0062433 | A1* | 3/2006 | Ikeda | 382/107 |
| 2006/0115185 | A1* | 6/2006 | Iida et al. | 382/305 |
| 2007/0065112 | A1* | 3/2007 | Yamada | 386/96 |
| 2007/0300250 | A1* | 12/2007 | Smith et al. | 725/20 |
| 2008/0085055 | A1* | 4/2008 | Cerosaletti et al. | 382/225 |
| 2008/0297510 | A1* | 12/2008 | Callegari | 345/424 |
| 2009/0021513 | A1* | 1/2009 | Joshi et al. | 345/419 |
| 2009/0133051 | A1* | 5/2009 | Hildreth | 725/28 |
| 2009/0251478 | A1* | 10/2009 | Maillot et al. | 345/581 |
| 2009/0282336 | A1* | 11/2009 | Lindley et al. | 715/716 |

FOREIGN PATENT DOCUMENTS

| | | |
|---|---|---|
| JP | 2002 369076 | 12/2002 |
| JP | 2003 256865 | 9/2003 |

* cited by examiner

*Primary Examiner* — Xiao M. Wu
*Assistant Examiner* — Michael J Cobb
(74) *Attorney, Agent, or Firm* — Frommer Lawrence & Haug LLP; William S. Frommer; Ellen Marcie Emas

(57) ABSTRACT

Provided is an image processing apparatus which includes an image selection unit selecting one image data from a plurality of input image data, an image generation unit generating a computer graphics image based on computer graphics description data, an image mapping unit determining an object or a portion of the object of computer graphics drawn by the image generation unit as the target of texture mapping and texture-mapping an image according to the image data selected by the image selection unit onto a surface of the target of texture mapping, and an image selection control unit controlling the image data selection by the image selection unit according to an attribute given to the target of texture mapping.

9 Claims, 25 Drawing Sheets

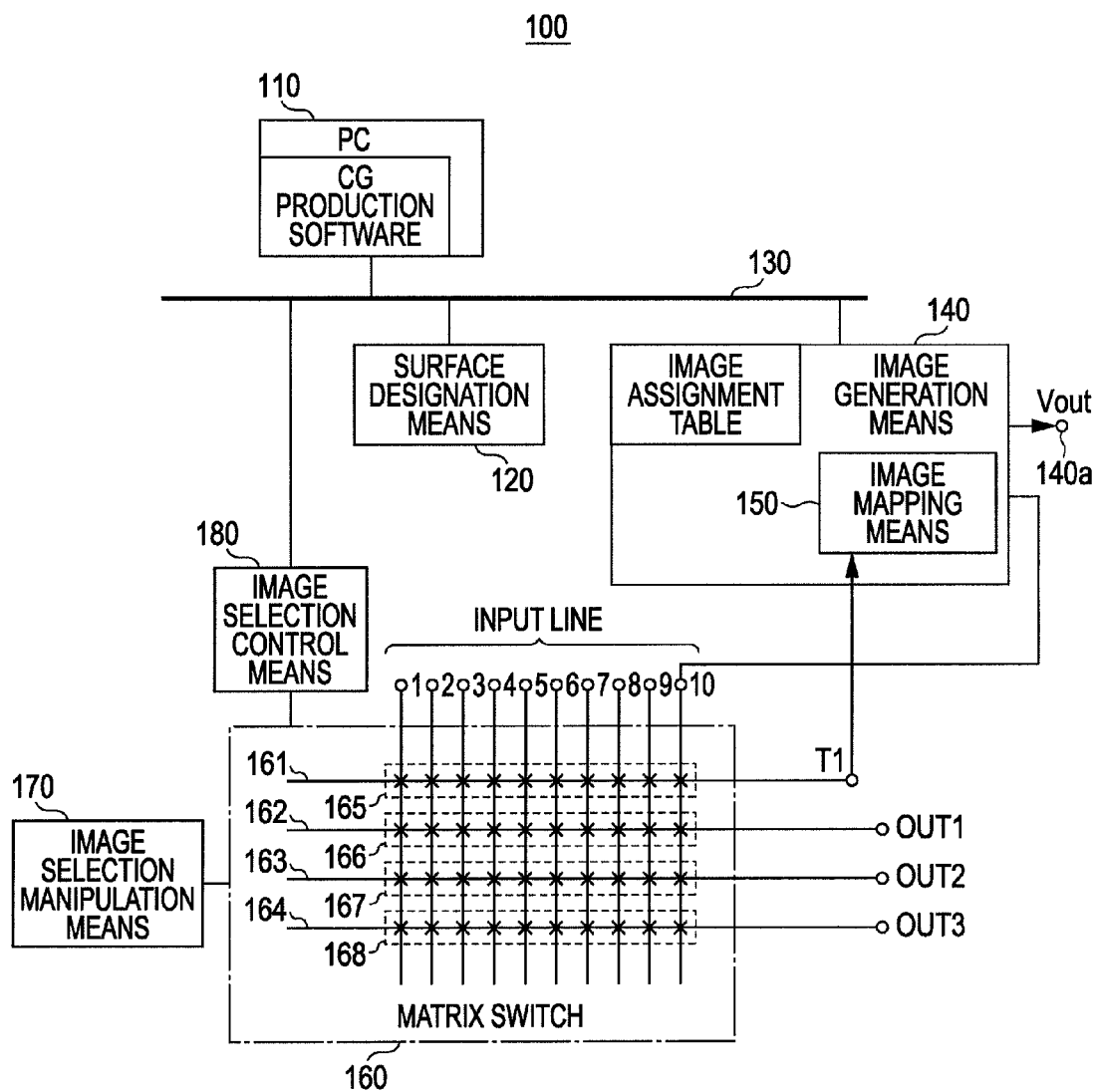

FIG. 2

KIND EXAMPLE: phong

| PARAMETER | VALUE | MEANING |
|---|---|---|
| ⟨emission⟩ | COLOR | QUANTITY OF LIGHT TO BE EMITTED FROM LIGHT SOURCE |
| ⟨ambient⟩ | COLOR | QUANTITY OF AMBIENT LIGHT TO BE EMITTED |
| ⟨diffuse⟩ | COLOR | QUANTITY OF DIFFUSED LIGHT TO BE REFLECTED |
| ⟨specular⟩ | COLOR | QUANTITY OF LIGHT REFLECTED FROM MIRROR SURFACE |
| ⟨shininess⟩ | NUMERICAL VALUE | REFLECTIVE PROJECTION OF MIRROR SURFACE |
| ⟨reflective⟩ | COLOR | TOTAL MIRROR SURFACE REFLECTION |
| ⟨reflectivity⟩ | NUMERICAL VALUE | ADDITIONAL QUANTITY OF LIGHT OF TOTAL MIRROR SURFACE REFLECTION |
| ⟨transparent⟩ | COLOR | COLOR OF TOTALLY REFRACTED LIGHT |
| ⟨transparency⟩ | NUMERICAL VALUE | ADDITIONAL QUANTITY OF LIGHT OF TOTAL REFRACTION |

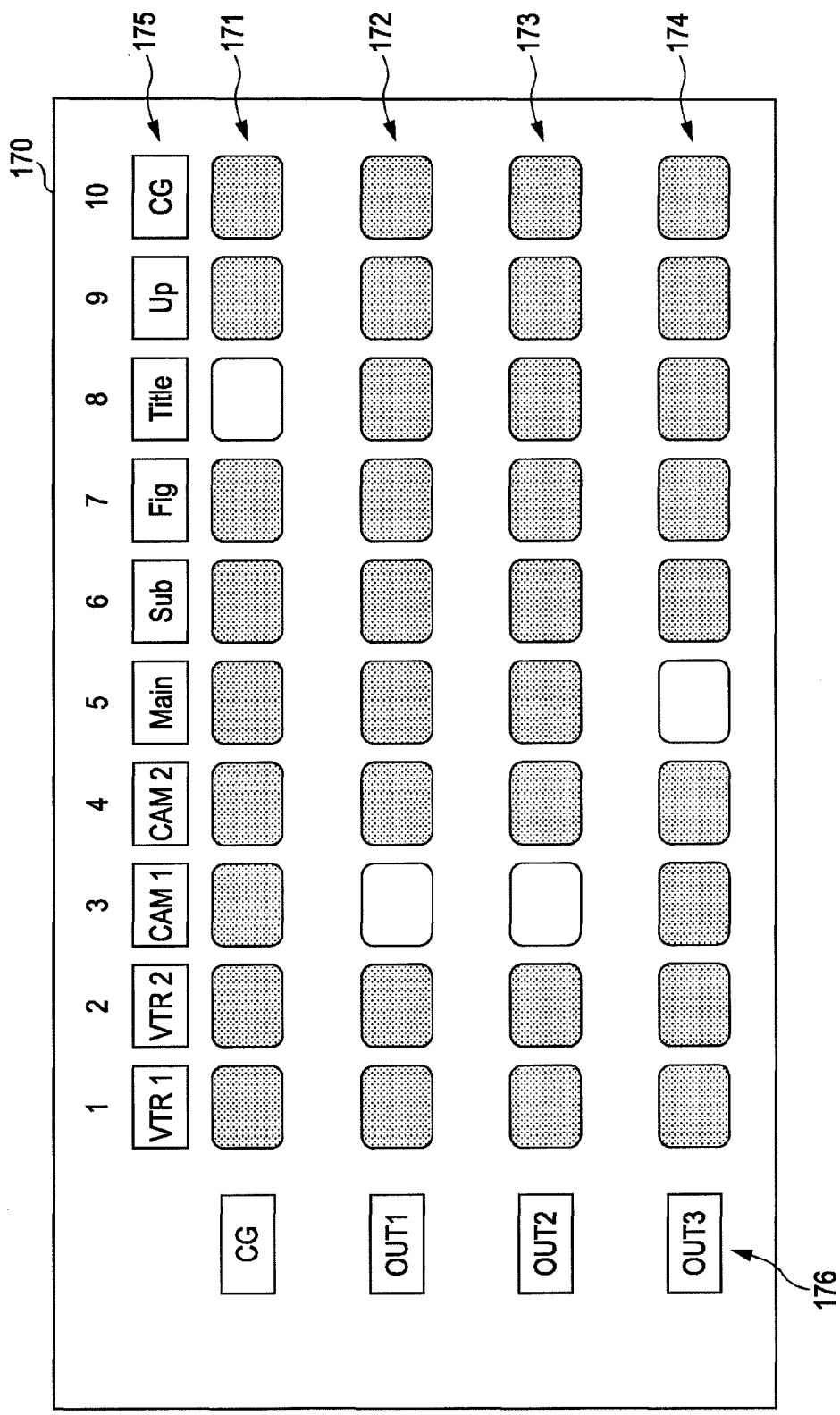

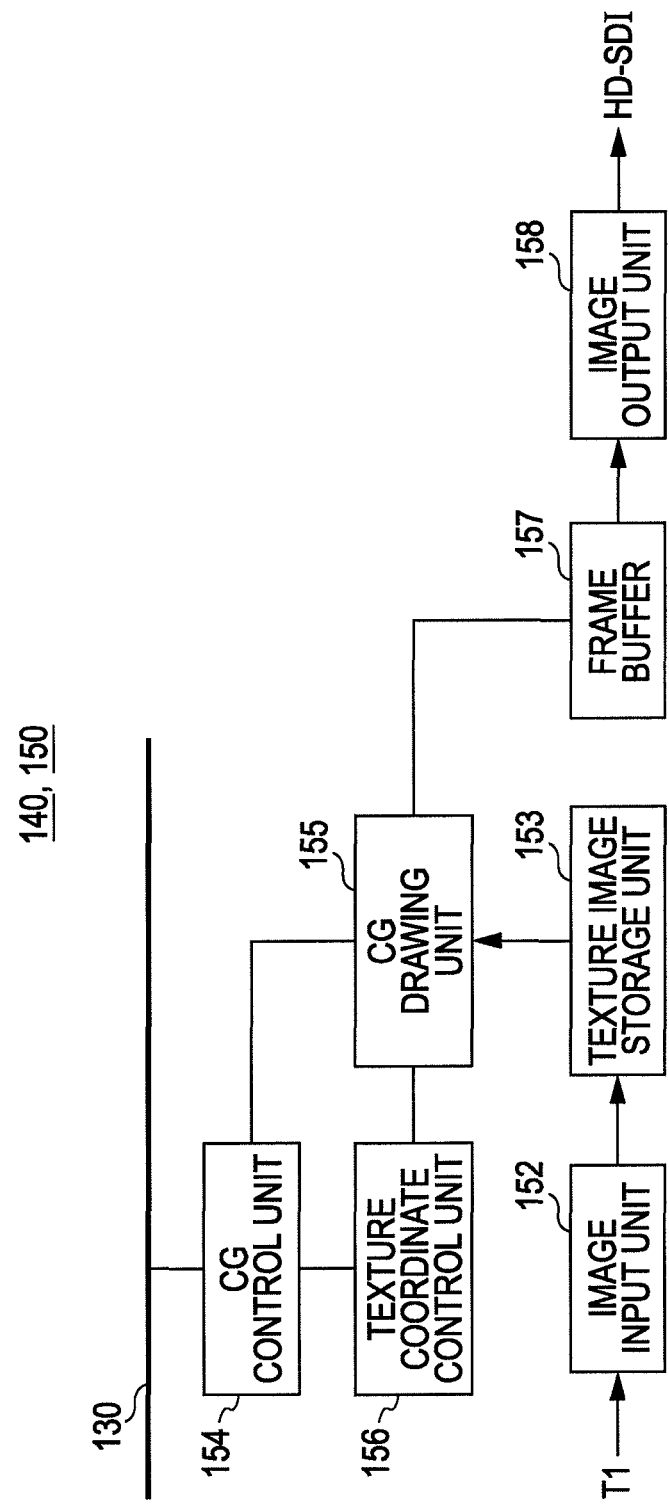

FIG. 8

| ATTRIBUTE m | IMAGE INPUT |
|---|---|
| p1 | 1 |
| p2 | 2 |

FIG. 9

| AMBIENT COLOR (RGBA) | | | | IMAGE INPUT |
|---|---|---|---|---|
| 0.588235 | 0.952941 | 0.921569 | 1.000000 | 1 |
| 0 | 0 | 0.9 | 1.000000 | 2 |
| 1 | 0.38 | 0.278431 | 1.000000 | 3 |

FIG. 23A

| 1 | OG | Select |
|---|------|--------|
| 2 | OUT1 | Select |
| 3 | OUT2 | Select |
| 4 | OUT2 | Select |

ASSIGNMENT OF OUTPUT BUS LINE

FIG. 23B

SELECTION OF OUTPUT BUS LINE

○ OUT1　　○ OUT8
○ OUT2　　○ OUT9
○ OUT3　　○ PP-A
○ OUT4　　○ PP-B
○ OUT5　　● CG
○ OUT6
○ OUT7

OK　　CANCEL

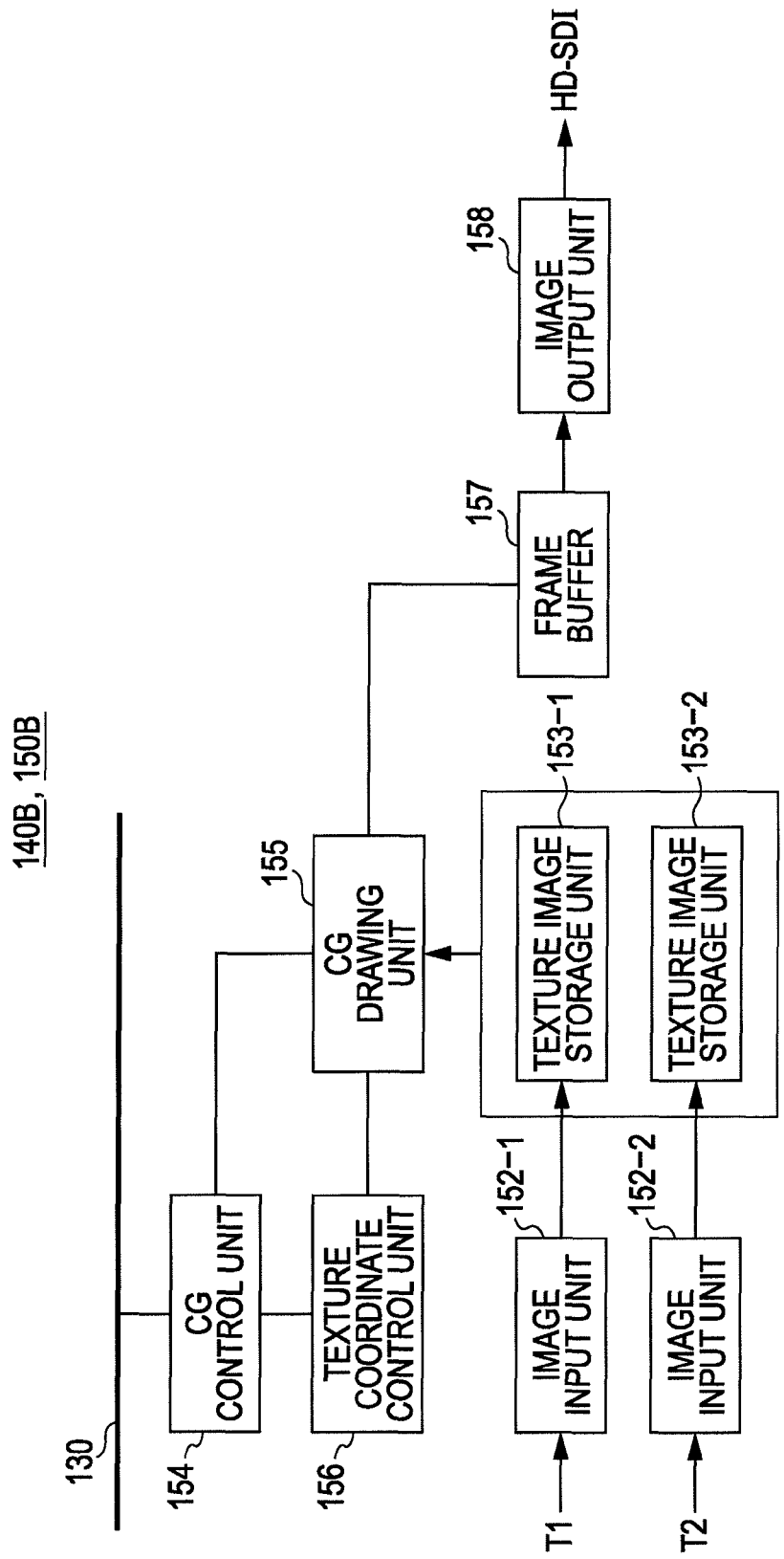

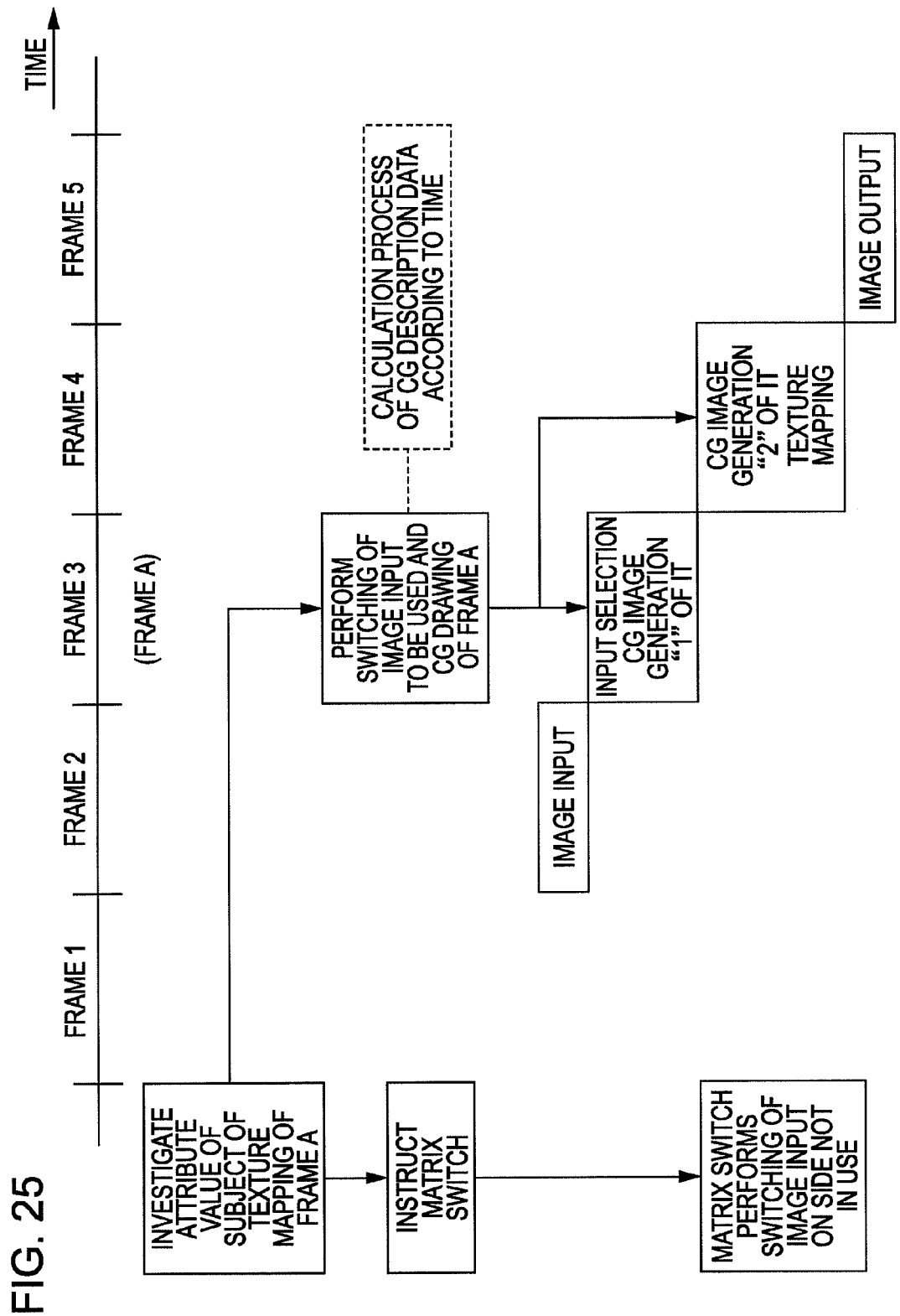

ined expressions from stereoscopic object data as textures (textures such as used as shading in an animation) is described, which analyzes data of computer graphics (CG) and automatically selects a screen tone.

IMAGE PROCESSING APPARATUS AND METHOD FOR TEXTURE-MAPPING AN IMAGE ONTO A COMPUTER GRAPHICS IMAGE

BACKGROUND OF THE INVENTION

1. Field of the Invention

The present application contains subject matter related to that disclosed in Japanese Priority Patent Application JP 2009-166172 filed in the Japan Patent Office on Jul. 14, 2009, the entire content of which is hereby incorporated by reference.

2. Description of the Related Art

In a three-dimensional graphics system, drawing of a whole image is performed by decomposing three-dimensional coordinates into polygons such as triangles and drawing the polygons. Accordingly, in this case, the three-dimensional image may be defined as a combination of polygons. However, surfaces of surrounding objects may have repeated patterns of complicated shapes in many cases, and as the shape or pattern of an object becomes complicated and elaborated, it becomes difficult to perform modeling of the corresponding shape or pattern into triangles or the like. As a means for solving this, texture mapping has been used.

The texture mapping realizes a high-reality image with a small number of vertexes by attaching image data received from a scanner or the like to the surface of an object, and defines mapping from an object coordinate system onto a texture coordinate system. The texture mapping obtains mapping from a window coordinate system onto a texture coordinate system, and obtains texture cell elements (texels) which are texture elements corresponding to respective picture cell elements (pixels) in the window coordinate system.

Image data that is used for texture is stored in a memory region that is called a texture memory. Accordingly, by performing updating of the texture memory as necessary by using moving image data, texture mapping processing with moving images becomes possible.

For example, in Japanese Unexamined Patent Application Publication No. 2002-369076, a three-dimensional special effects device is described, which gradually transits texture mapped image by changing texture coordinates with the lapse of time in an apparatus for texture-mapping a plurality of input images.

Also, for example, in Japanese Unexamined Patent Application Publication No. 2003-256865, a method of generating a two-dimensional image with animated expressions from stereoscopic object data as textures (textures such as used as shading in an animation) is described, which analyzes data of computer graphics (CG) and automatically selects a screen tone.

SUMMARY OF THE INVENTION

Even in the case of texture-mapping a moving image, in a CG production process, it is difficult to perform the work simultaneously with viewing the image being texture-mapped during operation. On the other hand, in the case of producing animation using CG, it may be intended during production to determine a point (time point) at which it is desired to change a moving image to be texture-mapped for the movement/change of the animation.

In the related art, since the switching of a moving image is performed by manipulating an image selection unit during operation, it is difficult to match a predetermined timing of the CG animation operation. Also, since the proceeding speed of an animation operation may be changed, it is difficult to match the timing in that case.

In view of the above situation, it is desirable to make it possible to provide a production environment in which the switching timing of an image to be texture-mapped can be easily designated during CG production in the case of using the produced CG for the operation of live broadcasting.

According to an embodiment of the present invention, there is provided an image processing apparatus, which includes an image selection means for selecting one image data from a plurality of input image data; an image generation means for generating a computer graphics image based on computer graphics description data; an image mapping means for determining an object or a portion of the object of computer graphics drawn by the image generation means as the target of texture mapping and texture-mapping an image according to the image data selected by the image selection means onto a surface of the target of texture mapping; and an image selection control means for controlling the image data selection by the image selection means in accordance with an attribute that is given to the target of texture mapping among the computer graphics description data.

In an embodiment of the invention, one image data is selected from the plurality of input image data by the image selection means. For example, the image selection means has input lines for inputting the plurality of input image data and a matrix switch provided with an output line for outputting one image data selected from the plurality of input image data, and inputs the image data output from the output line to the image mapping means. Also, for example, the image selection means selects one image data from the plurality of input image data input from the image mapping means as the image data that is used in the image mapping means.

Also, for example, the image selection means has input lines for inputting the plurality of input image data and a matrix switch provided with a plurality of output lines for outputting one image data selected from the plurality of input image data. The image selection means inputs the image data output from the plurality of output lines to the image mapping means, and selects one image data from the plurality of image data input to the image mapping means as the image data that is used in the image mapping means.

By the image generation means, the computer graphics image is generated based on the computer graphics description data. In this case, the drawing of the whole image is performed by decomposing three-dimensional coordinates into polygons such as triangles and drawing the polygons. Also, by the image mapping means, an object of computer graphics drawn by the image generation means or a portion of the object becomes the target of texture mapping, and the image according to the image data extracted by the image selection means is texture-mapped onto the surface of the target of texture mapping. For example, the portion of the object may be a division unit of a surface or polygon mesh or the like.

By the image selection control means, the image data extracted by the image selection means is controlled in accordance with the attribute that is given to the target of texture mapping among the computer graphics description data. For example, the attribute may be material definition, surface information that the material definition has, or the like. For example, the correspondence relationship between a value of the attribute value and image data is generated by the information generation means. The image selection control means controls the image data extracted by the image selection means based on, for example, the correspondence relationship.

As described above, the image according to the image data extracted by the image selection means is texture-mapped onto the surface of the target of texture mapping. Also, the image data extracted by the image selection means is controlled in accordance with the attribute that is given to the target of texture mapping among the computer graphics description data. Accordingly, by changing the attribute that is given to the target of texture mapping, the switching timing of the image being texture-mapped can be easily designated during the CG production.

According to the embodiments of the present invention, the image data of the image that is texture-mapped onto the surface of the target of texture mapping is controlled in accordance with the attribute that is given to the target of texture mapping among the computer graphics description data, and thus by changing the attribute that is given to the target of texture mapping, the switching timing of the image that is texture-mapped onto the target of texture mapping can be easily designated during the CG production.

BRIEF DESCRIPTION OF THE DRAWINGS

FIG. 1 is a block diagram illustrating a configuration example of an image processing apparatus according to a first embodiment of the invention;

FIG. 2 is a diagram illustrating an example of surface information on a material;

FIG. 3 is a diagram illustrating an example of an external appearance of an image selection manipulation unit (manipulation table);

FIG. 5 is a diagram illustrating a configuration example of function blocks of an image generation unit and an image mapping unit;

FIG. 8 is a diagram illustrating an example of an image assignment table showing the correspondence relationship between respective values of attributes given to the target of texture mapping among CG description data and image data;

FIG. 9 is a diagram illustrating an example of an image assignment table showing the correspondence relationship between respective values of attributes (ambient colors) given to the target of texture mapping among CG description data and image data;

FIGS. 23A and 23B are diagrams illustrating an example of GUI display that is displayed during assignment of output bus lines and an example of GUI display that is displayed during selection of an output bus line;

FIG. 24 is a diagram illustrating a configuration example of function blocks of an image generation unit and an image mapping unit;

FIG. 25 is a diagram illustrating an operation timing of each processing for texture mapping;

DESCRIPTION OF THE PREFERRED EMBODIMENTS

Figure 4:
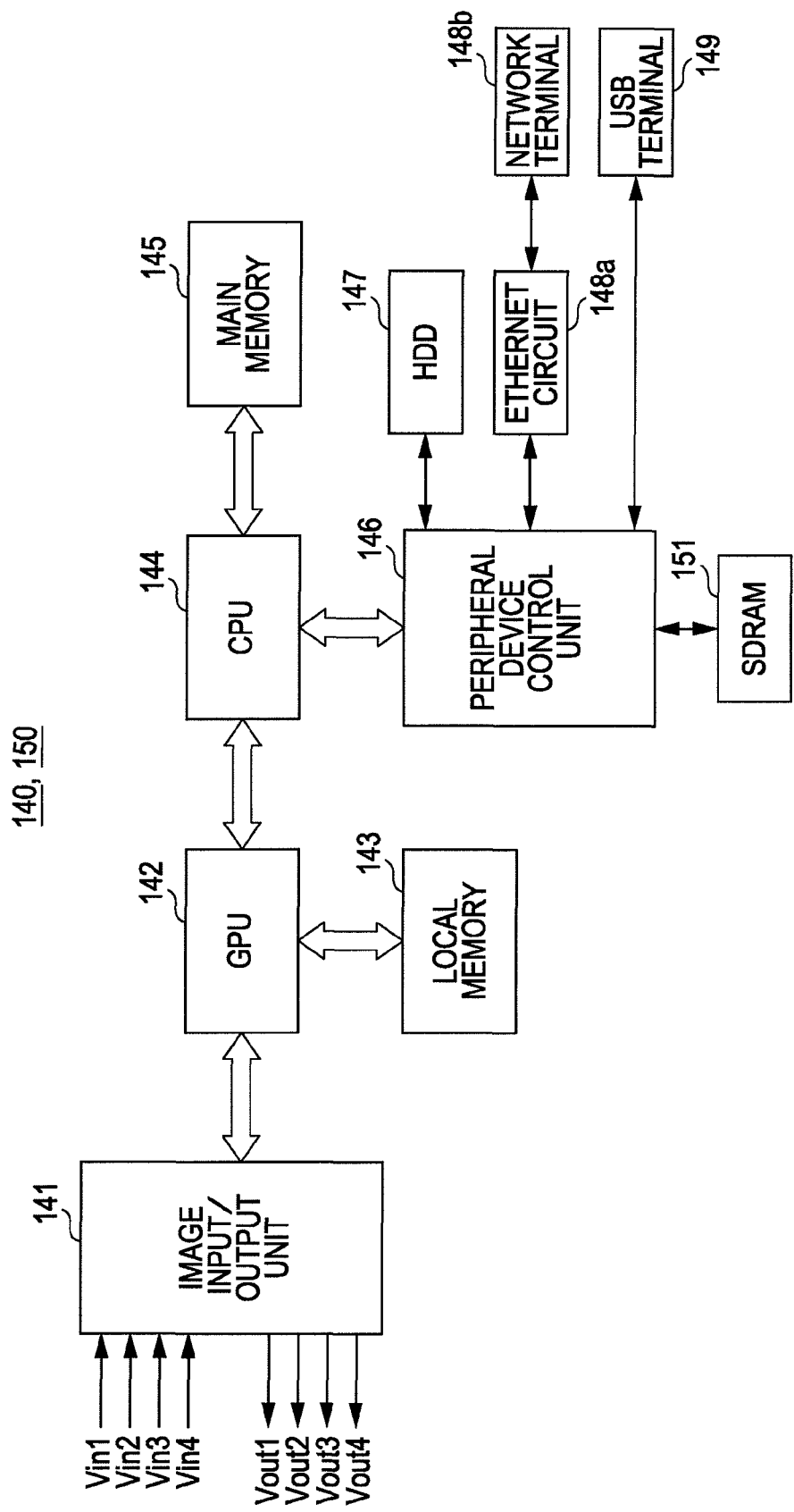
FIG. 4 is a block diagram illustrating a detailed configuration example of an image generation unit and an image mapping unit.

Hereinafter, best modes (hereinafter referred to as "embodiments") for carrying out the invention will be described. In this case, the explanation will be made in the following order.

1. First embodiment
2. Second embodiment
3. Third embodiment
4. Modifications

1. First Embodiment

[Configuration of an Image Processing Apparatus]

The first embodiment of the present invention will be described. FIG. 1 illustrates a configuration of an image processing apparatus 100 according to the first embodiment. The image processing apparatus 100 includes a CG (Computer Graphics) production unit 110, a surface designation unit 120, a network 130, an image generation unit 140, and an image mapping unit 150. Also, the image processing apparatus 100 includes a matrix switch 160, an image selection manipulation unit 170, and an image selection control unit 180. The CG production unit 110, the surface designation unit 120, and the image generation unit 140 are connected to the network 130, respectively. The matrix switch 160 constitutes an image selection unit.

The CG production unit 110 is configured by a PC (Personal Computer) having CG production software. The CG production unit 110 outputs CG description data of a predetermined format. As a format of CG description data, for example, there is Collada (registered trademark). Collada is a definition of technology for realizing the switching of a three-dimensional (3D) CG data on XML (Extensible Markup Language). The CG description data describes, for example, the following information.

(a) Definition of a Material

The definition of the material is the quality (vision) of the surface of a CG object. In the definition of the material, information on color, reflection type, light emission, concave-convex state, and the like, is included. Also, information on texture mapping may be included in the definition of the material. As described above, the texture mapping is a method of attaching an image to a CG object, and can express a complicated shape or the like while lightening the load of a processing system. FIG. 2 illustrates an example of surface information on the material. In this case, the texture mapping may be designated instead of colors.

(b) Definition of Geometric Information (Geometry)

In the definition of geometric information, information on positional coordinates of polygon mesh, coordinates of vertexes, and the like, is included.

(c) Definition of a Camera

In the definition of a camera, parameters of a camera are included.

(d) Definition of Animation

In the definition of animation, information on diverse values in each key frame of animation is included. Also, in the definition of animation, time information in each key frame of animation is included. Diverse information are information on, for example, time for key frame points of corresponding objects (nodes), coordinate values of positions or vertexes, sizes, tangent vectors, interpolation method, changes of animation of various kinds of information, and the like.

(e) Definition of Geometric Information Corresponding to a Position, Direction, and Size of a Node (Object) of a Scene, and Definition of a Corresponding Material Such information are not separately scattered, but, for example, correspond as follows.
  node . . . geometric information
  node . . . materials (plural)
  geometric information . . . a set of polygons (plural)
  a set of polygons . . . material (one of materials that correspond to a node)
  animation . . . node A technology that configures one picture is called a scene. Each definition is called a library, and is referred to in the scene. For example, in the case where two rectangular parallelepiped objects exist, each object is described as one node, and each node is coupled with any one of material definitions. As a result, the respective rectangular parallelepiped objects are coupled with the material definitions, and are drawn as colors or reflection characteristics according to the respective material definitions.

Also, in the case where the rectangular parallelepiped object is described as a plurality of polygon sets and the material definitions are coupled to the polygon sets, the polygon sets are drawn with different material definitions. For example, the object of the rectangular parallelepiped that has six sides may be described as three polygon sets in such a manner that three sides of the rectangular parallelepiped constitute one polygon set, one side constitutes one polygon set, and two sides constitute one polygon set. Since different material definitions can be coupled with the respective polygon sets, it is possible to lithograph the sides with different colors. In the image mapping unit to be described later, an object or a portion of an object (division unit of a surface or polygon mesh or the like) becomes the target of texture mapping.

Hereinafter, a sample of a Collada file (partially extracted) as CG description data will be described. In this sample, for example, a material having the name (value) of "01 MatDefault" has been defined. The actual contents of the material are described so as to refer to an effect of "01 MatDefault-fx". Also, in <library_visual_scenes> of the sample, the drawing of the geometric information definition of "#Box01-lib" in relation to the material definition of "01 MatDefault" has been described.

[A sample of a Collada file]

```
<library_materials>
    <material id="01MatDefault" name="01MatDefault"> material definition
        <instance_effect url="#01MatDefault-fx"/> refer to effect
    </material>
</library_materials>
<library_effects>
    <effect id="01MatDefault-fx"name="01MatDefault"> this is the contents of a material
        <profile_COMMON>
            <technique sid="standard">
                <phong>
                    <emission>
                        <color sid="emission">0.000000 0.000000 0.0000001.000000 </color>
                    </emission>
                    <ambient>     color is attached hitherto
                        <color sid="ambient">0.588235 0.952941 0.9215691.000000</color>
                    </ambient>
                    <diffuse>
                        <colorsid="diffuse">0.588235 0.952941 0.9215691.000000</color>
                    </diffuse>
                    <specular>
```

-continued

[A sample of a Collada file]

```
                            <color sid="specular">0.000000 0.000000
0.000000 1.000000</color>
                        </specular>
                        <shininess>
                            <float sid="shininess">2.000000</float>
                        </shininess>
                        <reflective>
                            <color sid="reflective">0.000000 0.000000
0.000000 1.000000</color>
                        </reflective>
                        <reflectivity>
                            <float sid="reflectivity">1.000000</float>
                        </reflectivity>
                        <transparent>
                            <color sid="transparent">1.000000 1.000000
1.000000 1.000000</color>
                        </transparent>
                        <transparency>
                            <float sid="transparency">0.000000</float>
                        </transparency>
                    </phong>
                </technique>
            </profile_COMMON>
        </effect>
    </library_effects>
    <library_geometries>
        <geometry id="Box01-lib" name="Box01Mesh">
            <mesh>
                <source id="Box01-lib-Position">
                    <float_array id="Box01-lib-Position-array" count="24"> arrangement of position information
-4.673016 -8.585480 0.000000
4.673016 -8.585480 0.000000
-4.673016 8.585480 0.000000
4.673016 8.585480 0.000000
-4.673016 -8.585480 10.185543
4.673016 -8.585480 10.185543
-4.673016 8.585480 10.185543
4.673016 8.585480 10.185543
</float_array>
                    <technique_common>
                        <accessor source="#Box01-lib-Position-array"
count="8" stride="3">
                            <param name="X" type="float"/> explanation of lines of arrangement of position information
                            <param name="Y" type="float"/>
                            <param name="Z" type="float"/>
                        </accessor>
                    </technique_common>
                </source>
                <source id="Box01-lib-UV0">
                    <float_array id="Box01-lib-UV0-array" count="24"> arrangement of UV coordinates
0.000000 0.000000 since it is a simple cube, only "0" and
"1" exist
1.000000 0.000000
0.000000 1.000000
1.000000 1.000000
0.000000 0.000000
1.000000 0.000000
0.000000 1.000000
1.000000 1.000000
0.000000 0.000000
1.000000 0.000000
0.000000 1.000000
1.000000 1.000000
</float_array>
                    <technique_common>
                        <accessor source="#Box01-lib-UV0-array"
count="12" stride="2">
                            Explanation of UV coordinates
                            <param name="S" type="float"/>
                            <param name="T" type="float"/>
                        </accessor>
                    </technique_common>
                </source>
                <vertices id="Box01-lib-Vertex">
                    <input semantic="POSITION" source="#Box02-lib-
```

-continued

[A sample of a Collada file]

```
Position"/>
            </vertices>
            <polygons material="01MatDefault" count="12">
                <input semantic="VERTEX" offset="0"source="#Box01-lib-Vertex"/>
                <input semantic="NORMAL" offset="1"source="#Box01-lib-Normal0"/>
                <input semantic="TEXCOORD" offset="2" set="0"source="#Box01-lib-UV0"/>
                <p>0 0 9 2 1 11 3 2 10</p>          vertex information
                <p>3 3 10 1 4 8 0 5 9</p>
                <p>4 6 8 5 7 9 7 8 11</p>
                <p>7 9 11 6 10 10 4 11 8</p>
                <p>0 12 4 1 13 5 5 14 7</p>
                <p>5 15 7 4 16 6 0 17 4</p>
                <p>1 18 0 3 19 1 7 20 3</p>
                <p>7 21 3 5 22 2 1 23 0</p>
                <p>3 24 4 2 25 5 6 26 7</p>
                <p>6 27 7 7 28 6 3 29 4</p>
                <p>2 30 0 0 31 1 4 32 3</p>
                <p>4 33 3 6 34 2 2 35 0</p>
            </polygons>
        </mesh>
    </geometry>
</library_geometries>
<library_animations>
    <animation id="Box01-anim" name="Box01">
        <animation>
            <source id="Box01-translate-animation-inputX">
                <float_array id="Box01-translate-animation-inputX-array"count="4">
0.000000 1.000000 1.033333 1.333333 time for change of X coordinate value of animation
                </float_array>
                <technique_common>
                    <accessor source="#Box01-translate-animation-inputX-array"count="4">
                        <param name="TIME" type="float"/>
                    </accessor>
                </technique_common>
            </source>
            <source id="Box01-translate-animation-outputX">
                <float_array id="Box01-translate-animation-outputX-array" count ="4">
−43.404125 −43.404125 −23.897228 13.150181 X coordinate value itself of animation
                </float_array>
                <technique_common>
                    <accessor source="#Box01-translate-animation-outputX-array"count="4">
                        <param name="X" type="float"/>
                    </accessor>
                </technique_common>
            </source>
            <source id="Box01-translate-animation-intanX">
                <float_array id="Box01-translate-animation-intanX-array"count="4">
0.000000 0.000000 1.884578 −0.000000
                </float_array>
                <technique_common>
                    <accessor source="#Box01-translate-animation-intanX-array"count="4">
                        <param name="X" type="float"/>
                    </accessor>
                </technique_common>
            </source>
            <source id="Box01-translate-animation-outtanX">
                <float_array id="Box01-translate-animation-outtanX-array"count="4">
0.000000 0.000000 16.961202 0.000000
                </float_array>
                <technique_common>
                    <accessor source="#Box01-translate-animation-outtanX-array"count="4">
                        <param name="X" type="float"/>
                    </accessor>
                </technique_common>
            </source>
```

[A sample of a Collada file]

```
            <source id="Box01-translate-animation-interpolationX">
                <Name_array id="Box01-translate-animation-
interpolationX-array"count="4">
    BEZIER BEZIER BEZIER BEZIER
</Name_array>
                <technique_common>
                    <accessor source="#Box01-translate-animation-
interpolationX-array"count="4">
                        <param type="name"/>
                    </accessor>
                </technique_common>
            </source>
            <sampler id="Box01-translate-animationX">
                <input semantic="INPUT"source="#Box01-translate-
animation-inputX"/>
                <input semantic="OUTPUT" source="#Box01-translate-
animation-outputX"/>
                            <input semantic="IN_TANGENT"source="#Box01-
translate-animation-intanX"/>
                            <input semantic="OUT_TANGENT"source="#Box01-
translate-animation-outtanX"/>
                <input semantic="INTERPOLATION" source="#Box01-
translate-animation-interpolationX"/>
            </sampler>
                            <channel source="#Box01-translate-
animationX"target="Box01/translate.X"/>
it is determined (target) here which animation information
the above-described information is
            </animation>
    <library_visual_scenes>
        <visual_scene id="RootNode" name="RootNode">
            <node id="Box01" name="Box01">
                            <translate sid="translate">-43.404125
0.6970370.000000</translate>
                <rotate sid="rotateZ">0 0 1 0.000000</rotate>
                <rotate sid="rotateY">0 1 0 0.000000</rotate>
                <rotate sid="rotateX">1 0 0 0.000000</rotate>
                <scale sid="scale">1.000000 1.000000 1.000000</scale>
                <instance_geometry url="#Box01-lib">       refer to
definition of geometric information
                    <bind_material>
                        <technique_common>
                            <instance_material
symbol="01MatDefault"target="#01MatDefault"/>
refer to material
                        </technique_common>
                    </bind_material>
                </instance_geometry>
            </node>
        </visual_scene>
    </library_visual_scenes>
```

Referring again to FIG. 1, the matrix switch 160 includes the image selection unit for selectively extracting one image data from a plurality of input image data. The matrix switch 160 is composed of 10 input lines, four output bus lines 161 to 164, and cross-point switch groups 165 to 168.

The 10 input lines are arranged in one direction as shown in the drawing. To the input lines "1" to "9", image data from a VTR, a video camera, and the like, is input. To the input line "10", CG image data output from the image generation unit 140 is input. The four output bus lines 161 to 164 are arranged in a different direction, crossing the input lines.

The cross-point switch group 165 performs connections at cross points where the 10 input lines and the output bus line 161 cross each other. The cross-point switch group 165 is controlled based on the control of the image selection control unit 180 or manipulator's image selection manipulation, and any one of image data input to the 10 input lines is selectively output to the output bus line 161. The output bus line 161 configures an output line (an auxiliary output line) of image data T1 for texture mapping.

Also, the cross-point switch groups 166, 167, and 168 perform connections at cross points where the 10 input lines and the output bus lines 162, 163, and 164 cross each other. The cross-point switch groups 166, 167, and 168 are controlled based on the manipulator's image selection manipulation, and any one of image data input to the 10 input lines is selectively output to the output bus lines 162, 163, and 164.

The output bus lines 162, 163, and 164 configure output lines of image data OUT1, OUT2, and OUT3 for external output. In this case, since the on/off operation of the respective cross-point switches of the cross-point switch groups 165 to 168 is to perform switching of the image data composed of a series of frame data, it is performed within a blanking period that is a gap between frames.

The image selection manipulation unit 170 receives a manipulation input of an instruction to the matrix switch 160. The image selection manipulation unit 170 is composed of press button lines which correspond to the respective output bus lines, and each button of the press button line corresponds to each input line.

FIG. 3 illustrates an example of an external appearance of an image selection manipulation unit (a manipulation table) 170. In the image selection manipulation unit 170, press button lines 171 to 174, which extend in left and right directions that correspond to the output bus lines 161 to 164, respectively, are installed in order in upward and downward directions. Each press button line is composed of alternative type press buttons that select connections of the respective input lines with the corresponding output bus lines, and the selected press button lights up.

On an upper part of the image selection manipulation unit (manipulation table) 170, a character display portion 175 is installed, and characters for identifying input images to the respective input lines are displayed. Also, on a left-side part of the image selection manipulation unit (manipulation table) 170, a character display portion 176 is installed, and characters for identifying the image data that is obtained from the output bus lines corresponding to the respective press button lines are displayed.

The image generation unit 140 generates a CG image that is a 3D space image based on the CG description data that is produced by the CG production unit 110. The image generation unit 140 generates an image of an animation frame in real time, rather than performing a rendering process with time. The image generation unit 140, when the CG description data is read, maintains information such as respective definitions and their corresponding portions as a data structure in a memory.

The image generation unit 140 also maintains various values in a key frame for executing the animation in the memory. For example, in order to lithograph polygon sets in geographic information of a certain node, the drawing is performed according to the designation of the colors or the like with reference to the geometric information and the corresponding material definitions. In the case of animation, the drawing is performed by proceeding with the current time for each frame and interpolating respective values before and after the key frame.

The surface designation unit 120 sends designation information of the CG object that is the target of texture mapping of an input image or a portion of the object (division unit of a surface or polygon mesh or the like) to the image generation unit 140. The image generation unit 140 controls the image mapping unit 150 to perform texture mapping of the input image onto the surfaces of the predetermined polygons (polygon sets) indicated by the designation information.

The image mapping unit 150 performs the texture mapping of an input image onto the surface of the target of texture mapping that is designated by the surface designation unit 120, among the CG drawn by the image generation unit 140. The image mapping unit 150 is packaged in a body with the image generation unit 140. The image mapping unit 150 is realized by the control through software on a CPU (Central Processing Unit) and the hardware operation of a GPU (Graphics Processing Unit) or the like. The control software designates the polygon sets to be texture-mapped and instructs the hardware.

Configuration Examples of an Image Generation Unit and an Image Mapping Unit

FIG. 4 illustrates a detailed configuration example of an image generation unit 140 and an image mapping unit 150. The image generation unit 140 and the image mapping unit 150 include an image input/output unit 141, a GPU 142, a local memory 143, a CPU 144, and a main memory 145. The image generation unit 140 and the image mapping unit 150 also include a peripheral device control unit 146, a hard disc drive (HDD) 147, an Ethernet circuit 148a, and a network terminal 148b. The image generation unit 140 and the image mapping unit 150 also include a USB (Universal Serial Bus) terminal 149, and an SDRAM (Synchronous DRAM) 151. The Ethernet is a registered trademark.

The image input/output unit 141 inputs image data for performing the texture mapping, and outputs image data of a CG image onto which an image according to the image data has been appropriately texture-mapped. The image input/output unit 141 can input four system image data at maximum, and can output four system image data at maximum. In this case, the image data that is processed herein is image data of the HD-SDI (High Definition television-Serial Digital Interface) standard that has been prescribed as SMPTE292M. The GPU 142 and the main memory 145 can be equally accessed by the image input/output unit 141.

The main memory 145 functions as a work area of the CPU 144, and temporarily stores image data input from the image input/output unit 141. The CPU 144 controls all of the image generation unit 140 and the image mapping unit 150. The CPU 144 is connected to the peripheral device control unit 146. The peripheral device control unit 146 performs an interface process between the CPU 144 and peripheral devices.

The CPU 144 is connected to the built-in hard disc drive 147 through the peripheral device control unit 146. The CPU 144 is also connected to the network terminal 148b through the peripheral device control unit 146 and the Ethernet circuit 148a. The CPU 144 is also connected to a USB terminal 149 through the peripheral device control unit 146. Further, the CPU 144 is connected to the SDRAM 151 through the peripheral device control unit 146.

The CPU 144 performs the control of texture coordinates. That is, the CPU 144 performs a process for texture-mapping the image according to the input image data onto the surfaces of polygons which are drawn by the GPU 142. The GPU 142 generates a CG image based on the CG description data maintained in the hard disc drive 147 or the like, and if necessary, performs the texture mapping of the input image onto the surface of the designated target of texture mapping. The local memory 143 functions as a work area of the GPU 142, and temporarily stores image data of the CG image prepared by the GPU 142.

The CPU 144 can access the local memory 143 in addition to the main memory 145. In the same manner, the GPU 142 can simultaneously access the local memory 143 and the main memory 145. The CG image data generated by the GPU 142 and first stored in the local memory 143 is sequentially read from the local memory 143, and then is output from the image input/output unit 141.

FIG. 5 illustrates a configuration example of function blocks of the image generation unit 140 and the image mapping unit 150. The image generation unit 140 and the image mapping unit 150 have function blocks of an image input unit 152, a texture image storage unit 153, a CG control unit 154, a CG drawing unit 155, a texture coordinate control unit 156, a frame buffer 157, and an image output unit 158.

The image input unit 152 and the image output unit 158 is configured by the image input/output unit 141. Also, the texture image storage unit 153 is configured by the main memory 145. Also, the CG control unit 154 and the texture coordinate control unit 156 are configured by the CPU 144. Also, the CG drawing unit 155 is configured by the GPU 142. Also, the frame buffer 157 is configured by the local memory 143.

The image input unit 152 and the texture image storage unit 153 form a pair, and by increasing them, the image input systems can be increased. Also, the frame buffer 157 and the image output unit 158 form a pair, and by increasing them, the image output systems can be increased.

Figure 6A:
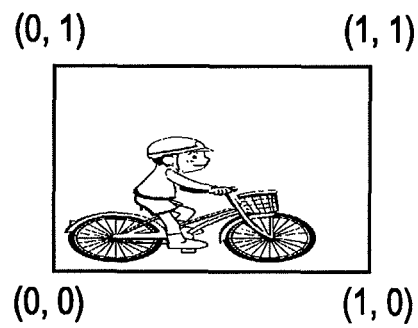
FIGS. 6A and 6B are diagrams illustrating an example of a texture image and a UV map when texture mapping is performed.
Figure 6B:
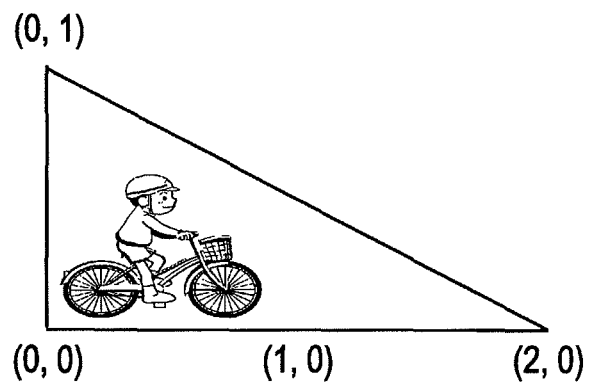

FIGS. 6A and 6B illustrate an example of a texture image and a UV map when texture mapping is performed. FIG. 6A shows a texture image, and FIG. 6B shows a UV map. Here, the UV map unit a map that is indicated as coordinates on a ground in the case where the surface of a certain object (node) is considered as the ground. If it is assumed that this map is spread on a plane, a point (x, y) on the plane corresponds to a point (u, v) on the surface of the object. Due to this, by performing a process of attaching the texture image to the UV map, the texture mapping for attaching the texture image onto the surface of the object becomes possible. FIG. 6B illustrates a state in which the texture image is attached to the UV map.

Referring again to FIG. 1, the surface designation unit 120, as described above, designates the target of texture mapping, onto which the input image is texture-mapped. The surface designation unit 120 sends its designation information to the image generation unit 140 through the network 130. The surface designation unit 120, for example, is realized by a GUI (Graphic User Interface). The surface designation unit 120 displays an object or a portion of the object among the CG description data as a selection to let a manipulator select one of them.

In the embodiment of the invention, among the CG description data, material definitions correspond to the target of texture mapping, and attributes such as surface information on the material definitions are given to the target. For example, in the case of making the material definitions correspond to the CG object, all surfaces of the CG object have the same surface attribute (color and so on). For example, in the case of a stone or a metal product such as a spoon, the CG can be prepared through such correspondence.

Figure 7:
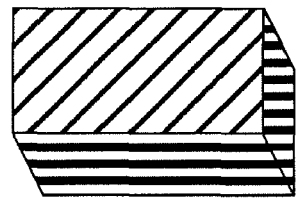
FIG. 7 is a diagram illustrating surfaces of a CG object (a subset of a polygon) to which different attributes have been given.

On the other hand, many articles have different surface attributes for their surfaces. For example, even a pencil has different surface attributes for its circumference, lead, cut grain, and the like. In the case of preparing CG of this article, the respective surfaces may be processed as different CG objects and then be combined. In this case, as illustrated in FIG. 7, the article may be considered as one CG object, and the CG work can be easily done by giving different attributes to the respective surfaces (subsets of polygons).

Generally, in the case of preparing the CG object, the polygon set that forms the surface is divided into several portions, material definitions are made to correspond to the respective portions, and the UV coordinate values for the texture mapping are determined for syntaxes of a target polygon. The CG description data is prepared to correspond to the above-described manipulations. By applying the CG description data to the embodiment of the present invention, the input image is texture-mapped onto a portion of the surface of the CG object, and also, the input image can be switched during the animation.

The surface designation unit 120 generates the correspondence relationship between respective values of attributes, which are given to the target of texture mapping among the CG description data, and the image data, and sets an image assignment table that indicates the correspondence relationship in the image generation unit 140. Here, the attribute may be a material definition or surface information on the material definition. The surface designation unit 120 displays, for example, respective values of attributes given to the target of texture mapping and respective image inputs to 10 input lines as a selection, and lets a manipulator select one among them to generate the correspondence relationship between the respective attribute values and the image data.

FIG. 8 illustrates an example of an image assignment table in the case where the "attribute m" among attributes given to the target of texture mapping is referred to. In the image assignment table as illustrated in FIG. 8, the value P1 of the "attribute m" corresponds to the image input "1", and the value P2 of the "attribute m" corresponds to the image input "2".

In this case, the image assignment table as illustrate in FIG. 8 is an example of a table in the case where image inputs "1" and "2" are texture-mapped when the value of the "attribute m" coincides with set values P1 and P2.

By contrast, in the case where the value of the attribute is within a certain range, a configuration that operates to perform texture mapping of the corresponding image input is also possible. For example, in the case of preparing the CG description data, an operation, which can intend to make a color that draws the surface of the CG object (a color definition among material definitions that correspond to the surface) correspond to the image input that is texture-mapped, will be described. Hereinafter, the color is inscribed by RGBA (Red Green Blue Alpha).

With respect to the material definition included in the CG description data, it is assumed that the image input that is texture-mapped is determined by its ambient color. FIG. 9 illustrates another example of an image assignment table. In the image assignment table as illustrated in FIG. 9, the attribute is an "ambient color". Also, "0.588235 0.952941 0.921569 1.000000" corresponds to the image input "1", "0 0 0.9 1.000000" corresponds to the image input "2", and "1 0.38 0.278431 1.000000" corresponds to the image input "3".

The color value is expressed as a set of four floating-point values. This is because in a method of determining whether data are in complete consistency, unlike the CG object name or the material definition name, there may be a possibility of inconsistency determination due to calculation errors which are caused by a difference between processing apparatuses and so on. Accordingly, the coincidence determination is performed within a predetermined range rather than the determination of complete consistency.

For example, in determining whether to perform texture mapping of an image input "1", the coincidence determination is performed by judging whether the following inequalities are satisfied within the permitted limit of 1% of the image assignment table values.

$$0.58235265 \leq R \leq 0.59411735$$

$$0.94341159 \leq G \leq 0.96247041$$

$$0.91235331 \leq B \leq 0.93078469$$

$$0.95 \leq A \leq 1.0$$

Here, respective values are calculated as follows.

$$0.588235 \times 0.99 = 0.58235265$$

$$0.588235 \times 1.01 = 0.59411735$$

$$0.952941 \times 0.99 = 0.94341159$$

$$0.952941 \times 1.01 = 0.96247041$$

$$0.921569 \times 0.99 = 0.91235331$$

$$0.921569 \times 1.01 = 0.93078469$$

In this case, since a value which exceeds "1" and a value which is less than "0" should be avoided, they are set to "1" and "0", respectively. The determination of whether to perform texture mapping of image inputs "2" and "3" may be performed in the same manner as described above.

Also, in the image assignment table, if the permitted limit as described above is given to other colors which correspond to other image inputs, a region where values overlap each other may occur in a color space. In this case, by determining a rule, i.e. by determining which image input is selected with respect to the values in the region, for example, by selecting a value of which the distance to the designated color (the Euclid distance in the RGBA space) is near, the determination can cope with the above-described situation.

In order to confirm the animation operation while the CG description data is prepared by software on the PC, a manipulator may prepare a moving image of the animation by a simple rendering and so on and see the moving image with his/her eyes. In this case, if colors of the respective surfaces are changed, the manipulator can easily recognize such change. According to the above-described process, the color change corresponds to the image input that is texture-mapped, and thus it becomes possible for the manipulator to easily imagine the shape corresponding to the switching of the texture mapping although the texture mapping is not performed during the preparation of the CG description data.

Referring again to FIG. 1, the image selection control unit 180 controls the image data T1 that is selected by the matrix switch 160 in accordance with the attribute that is given to the target of texture mapping among the CG description data. The image data T1 is image data for texture mapping that is selectively output to the output bus line 161. The image selection control unit 180 controls the image data T1 selected by the matrix switch 160 based on the image assignment table that is set in the image generation unit 140.

For example, if the image assignment table set in the image generation unit 140 is the image assignment table as illustrated in FIG. 8 as described above, the following control operation is performed. That is, when the value of the "attribute m" that is given to the target of texture mapping among the CG description data becomes p1 in the progress of the animation, the control is performed so that the image input "1" is selected as the image data T1. Also, when the value of the "attribute m" that is given to the target of texture mapping among the CG description data becomes p2 in the progress of the animation, the control is performed so that the image input "2" is selected as the image data T1. Even in the case where the image assignment table set in the image generation unit 140 is the image assignment table as illustrated in FIG. 9, the same control operation is performed. In this case, however, the coincidence determination is performed within a predetermined range rather than the determination of the complete consistency.

Operation Example of an Image Processing Apparatus

The operation of the image processing apparatus 100 as illustrated in FIG. 1 will be described. The CG production unit 110 generates the CG description data for generating a predetermined CG image by the CG production software. The CG description data generated in the CG production unit 110 is sent to the image generation unit 140 and the surface designation unit 120 through the network 130.

In the surface designation unit (GUI) 120, an object or a portion of the object among the CG description data becomes a selection, and the target of texture mapping for texture-mapping the input image is designated by a manipulator's manipulation. This designation information is sent from the surface designation unit 120 to the image generation unit 140.

Also, the surface designation unit 120 generates the correspondence relationship between each value of attribute, which is given to the target of texture mapping among the CG description data by the manipulator's manipulation, and the image data (input line). Also, the surface designation unit 120 sets the image assignment table (see FIGS. 8 and 9) that indicates the correspondence relationship in the image generation unit 140.

The image generation unit 140 generates the CG image that is a 3D space image based on the CG description data produced by the CG production unit 110. Also, as described above, the designation information of the object that is the target of texture mapping or a portion of the object is sent from the surface designation unit 120 to the image generation unit 140. The image generation unit 140 controls the image mapping unit 150 to perform the texture mapping of the input image (image according to the image data T1) onto the surface of the target of texture mapping.

The image mapping unit 150, under the control of the image generation unit 140, performs the texture mapping of the image according to the image data T1 that is obtained by the matrix switch 160 onto the surface of the target of texture mapping. From an output terminal 140a of the image generation unit 140, image data Vout of the CG image, which is obtained by texture-mapping the image according to the image data T1 onto the surface of the target of texture mapping, is output.

Also, the image generation unit 140 monitors attribute values which are given to the target of texture mapping among the CG description data produced by the CG production unit 110. Also, the image generation unit 140 compares the attribute values with the values in the image assignment table set by the surface designation unit 120, and sends a control signal to the image selection control unit 180 in accordance with the result of comparison.

Then, the image selection control unit 180 controls the cross-point switch groups 165 in the matrix switch 160. That is, if the attribute value coincides with the value in the image assignment table, or the attribute value is within a predetermined range with respect to the value in the image assignment table, an image input that corresponds to the value is extracted as the image data T1.

In this case, if the image assignment table as illustrated in FIG. 8 is set in the image generation unit 140, the following operation is performed. When the value of the "attribute m" that is given to the target of texture mapping becomes p1 in the progress of the animation, the image input "1" is extracted from the matrix switch 160 as the image data T1. Accordingly, in the image mapping unit 150, the image according to the image input "1" is texture-mapped onto the surface of the target of texture mapping.

Also, when the value of the "attribute m" that is given to the target of texture mapping becomes p2, the image input "2" is extracted from the matrix switch 160 as the image data T1. Accordingly, in the image mapping unit 150, the image according to the image input "2" is texture-mapped onto the surface of the target of texture mapping.

Figure 10:
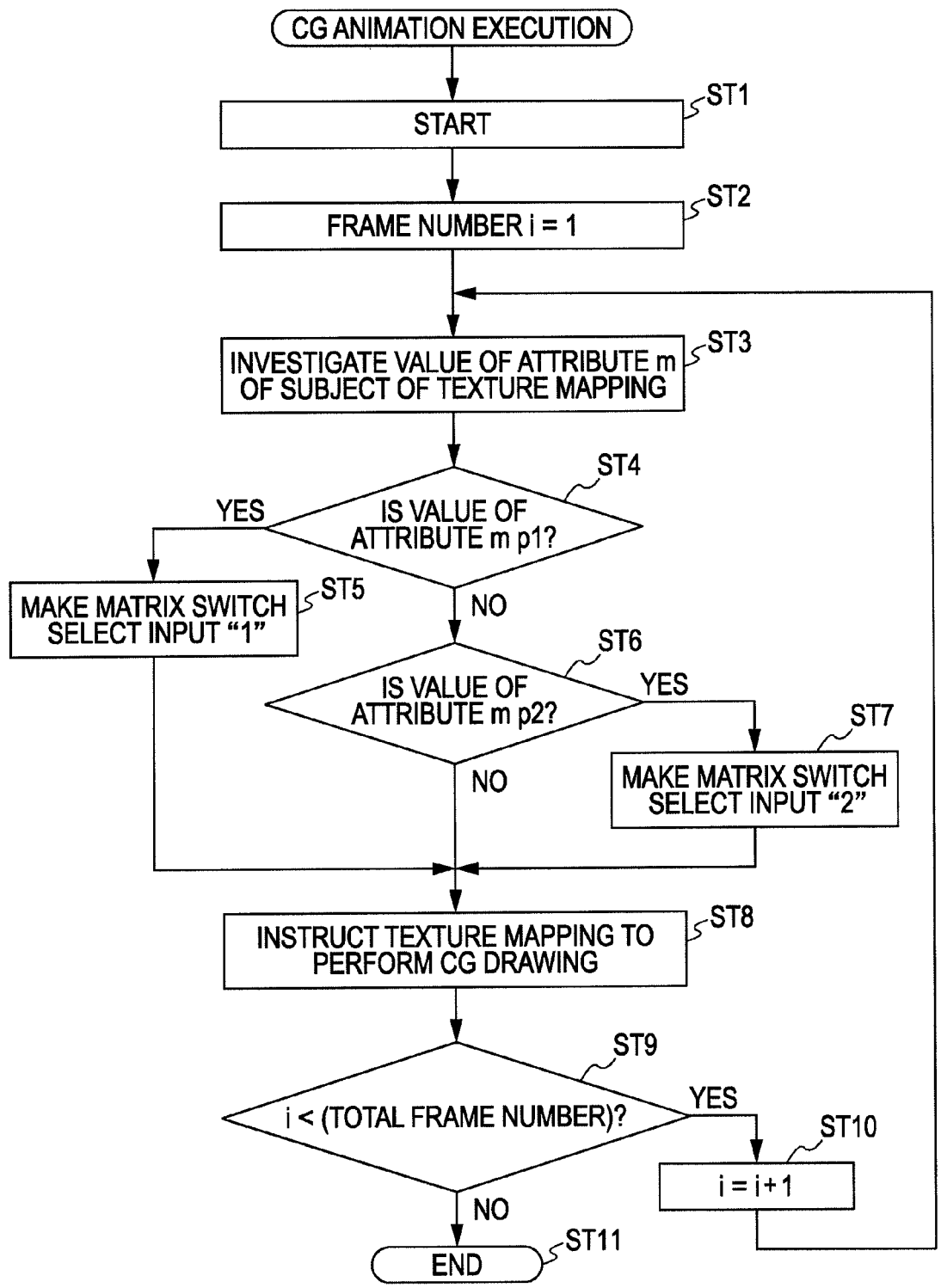
FIG. 10 is a flowchart illustrating a processing example of a control unit of an image generation unit and an image selection control unit during CG animation execution.

The flowchart of FIG. 10 shows a processing example of a control unit of the image generation unit 140 and the image selection control unit 180 during the execution of the CG animation. In this processing example, it is assumed that the image generation unit 140 and the image selection control unit 180 are controlled by a common control unit (CPU). Also, in this processing example, it is assumed that the image assignment table as illustrated in FIG. 8 is set in the image generation unit 140.

The control unit starts the processing according to the execution of the CG animation in step ST1. The control unit sets a frame number i to "1" in step ST2. Also, in step ST3, the control unit investigates the value of the attribute m that is given to the target of texture mapping, and proceeds to step ST4.

In step ST4, the control unit judges whether the value of the attribute m is p1. If the value of the attribute m is p1, the control unit controls the matrix switch 160 to select the image input "1" as the image data T1 in step ST5. Also, if the value of the attribute m is not p1, the control unit proceeds to step ST6.

In step ST6, the control unit judges whether the value of the attribute m is p2. If the value of the attribute m is p2, the control unit controls the matrix switch 160 to select the image input "2" as the image data T1 in step ST7. Also, if the value of the attribute m is not p2, the control unit proceeds to step ST8.

After the processing in step ST5 or ST7, the control unit proceeds to step ST8. In step ST8, the control unit performs the CG drawing in a frame i, that is, the CG drawing according to the proceeding of the animation, and instructs the image mapping unit 150 to perform the texture mapping. Then, the control unit proceeds to step ST9.

In step ST9, the control unit judges whether the frame number i is equal to or smaller than the total number of frames. If the frame number i is equal to or smaller than the total number of frames, the control unit increments the frame number i in step ST10, and then returns to the processing of step ST3 to proceed to the processing of the next frame. In step ST9, if frame number i is larger than the total number of frames, the control unit ends the processing in step ST11. That is, the animation is ended.

Figure 11:
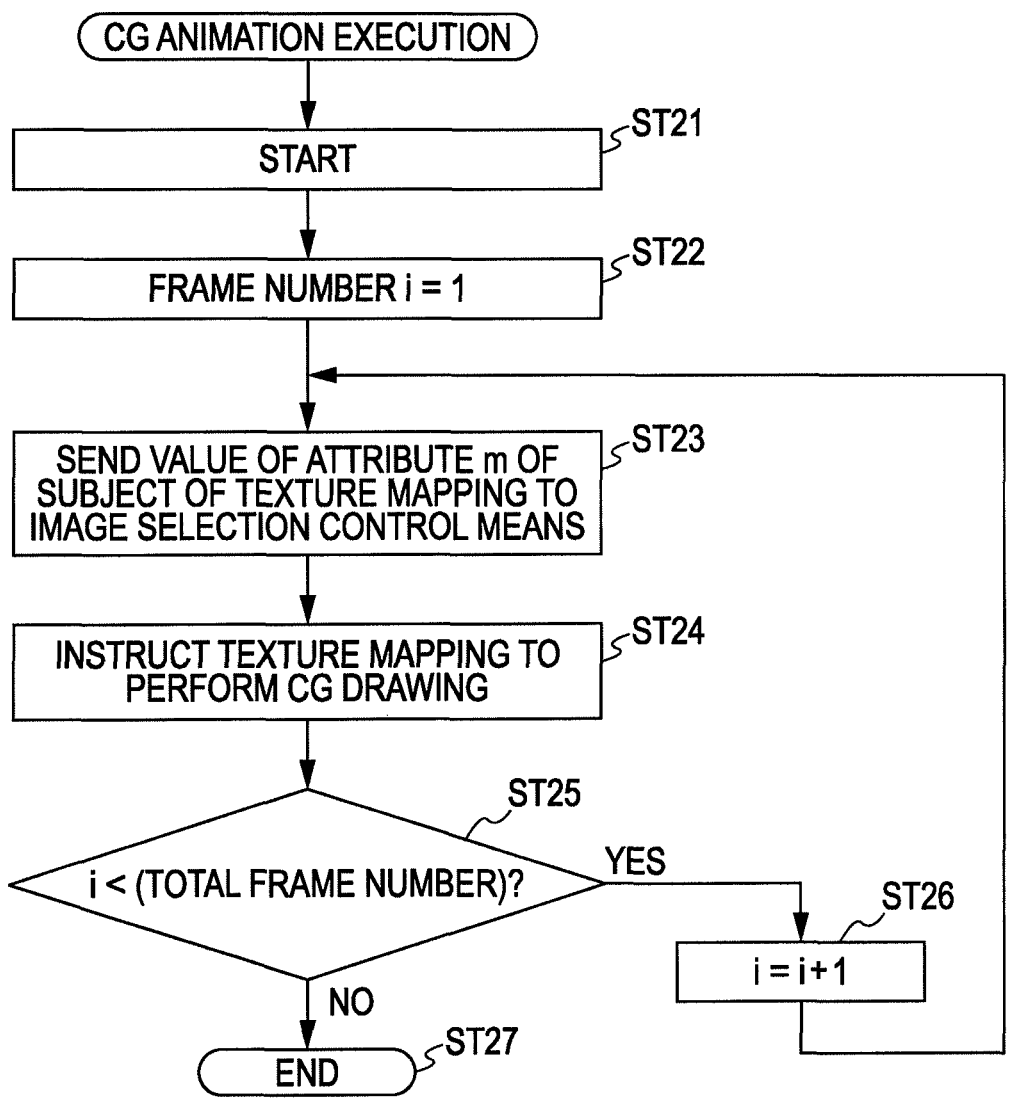
FIG. 11 is a flowchart illustrating a processing example of a control unit of an image generation unit during CG animation execution.
Figure 12:
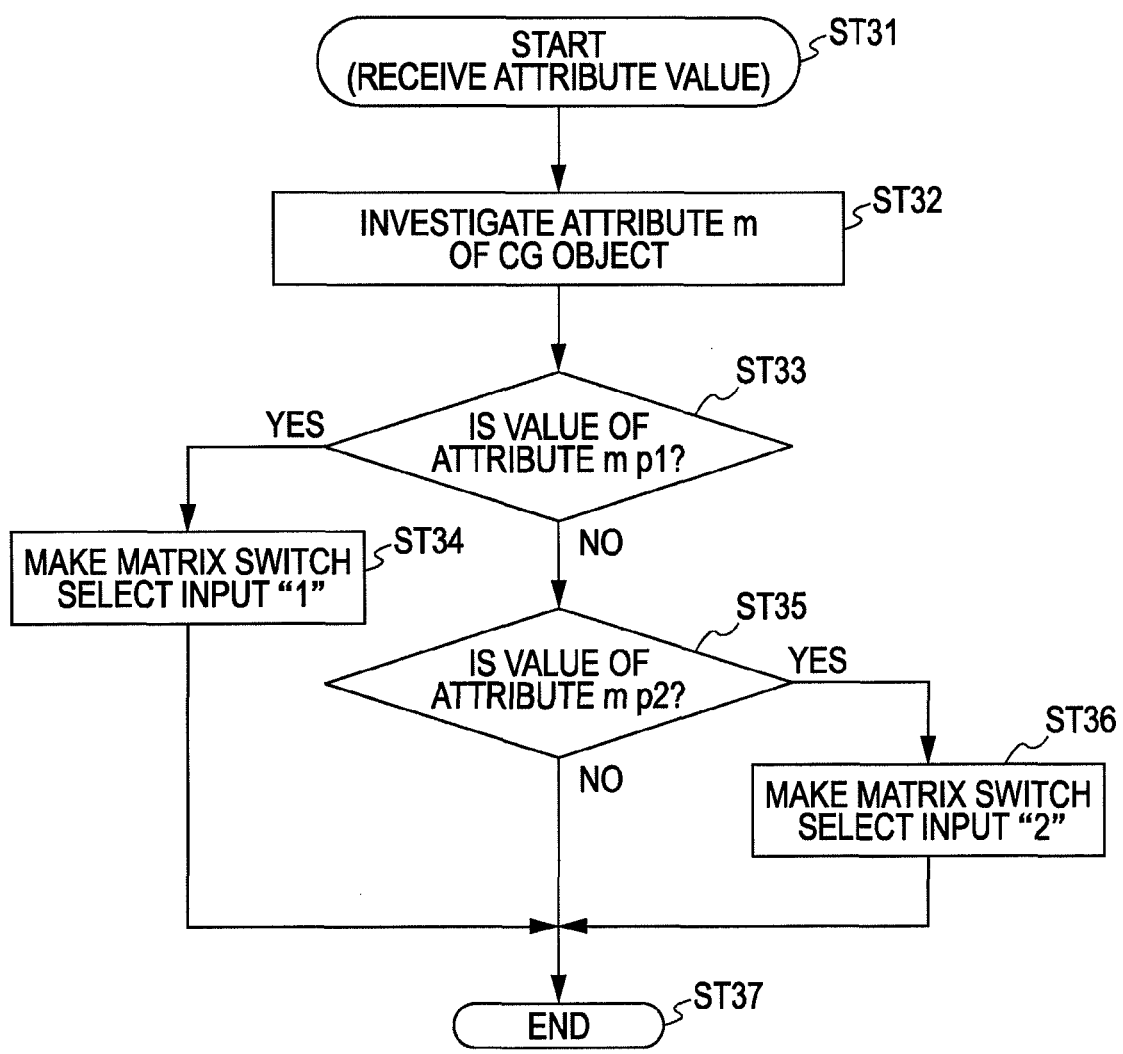
FIG. 12 is a flowchart illustrating a processing example of a control unit of an image selection control unit during CG animation execution.

The flowchart of FIG. 11 shows a processing example of the control unit of the image generation unit 140 during the CG animation execution. The flowchart of FIG. 12 shows a processing example of the control unit of the image selection control unit 180 during the CG animation execution. In these processing examples, it is assumed that the image generation unit 140 and the image selection control unit 180 are controlled by a separate control unit CPU. Also, in these processing examples, it is assumed that the image assignment table as illustrated in FIG. 8 has been set in the image generation unit 140.

Based on the flowchart of FIG. 11, the processing example of the control unit of the image generation unit 140 will be described. In step ST21, the control unit starts the processing in accordance with the execution of the CG animation. The control unit sets the frame number i to "1" in step ST22, and transfers the value of the attribute m that has been given to the target of texture mapping to the image selection control unit 180 in step ST23. Then, the control unit performs the CG drawing in the frame i, and instructs the image mapping unit 150 to perform the texture mapping in step ST24.

In step ST25, the control unit judges whether the frame number i is equal to or smaller than the total number of frames. If the frame number i is equal to or smaller than the total number of frames, the control unit increments the frame number i in step ST26, and then returns to the processing of step ST23 to proceed to the processing of the next frame. In step ST25, if frame number i is larger than the total number of frames, the control unit ends the processing in step ST27.

Based on the flowchart of FIG. 12, the processing example of the control unit of the image selection control unit 180 will be described. In step ST31, the control unit starts the processing by receiving the value of the attribute m. Then, the control unit proceeds to the processing of step ST32. In step ST32, the control unit investigates the value of the attribute m that has been given to the target of texture mapping.

Then, in step ST33, the control unit judges whether the value of the attribute m is p1. If the value of the attribute m is p1, the control unit controls the matrix switch 160 to select the image input "1" as the image data T1 in step ST34. After the processing of step ST34, the control unit ends the processing in step ST37.

Also, if the value of the attribute m is not p1 in step ST33, the control unit judges whether the value of the attribute m is p2 in step ST35. If the value of the attribute m is p2, the control unit controls the matrix switch 160 to select the image input "2" as the image data T1 in step ST36. After the processing of step ST36, the control unit ends the processing in step ST37. Also, if the value of the attribute m is not p2 in step ST35, the control unit ends the processing in step ST37.

In the above-described example, the image assignment table of FIG. 8 has two rows. Even if the image assignment table has more rows and correspondences between the value of the attribute m and the image input, the comparison is repeated as many as the number of rows so that the values can be easily known.

Next, the operation timing of the image processing apparatus 100 of FIG. 1 will be described. As described above, simultaneously with the generation of the CG image in the image generation unit, the image (input image) according to the input image data T1 is texture-mapped in the image mapping unit 150. Then, the image data of the CG image after the texture mapping is output.

At this time, the input image data T1, in the unit of a frame or a field, is temporarily written in the texture image storage unit 153 (see FIG. 5). Then, the image according to the input image data T1 is texture-mapped as the target of texture mapping of the CG image. As a result, the output image data of the CG image after the texture mapping is temporarily written in the frame buffer 157 (see FIG. 5). Then, the output image data is read from the frame buffer 157 to be output.

The texture mapped image among the output CG images is more than one frame late from an input time point. In other words, the texture mapped image among the output CG images is an input image which is past more than one frame. Depending upon the complexity of processing until the input image is output, the texture mapped image may be two-frame or three-frame late.

Due to this, if the image selection control unit 180 selects the input image that is used in the frame at a time point (frame) where respective frames of the animation are generated, the input image becomes late. Accordingly, it is necessary to select the input image before a time, which corresponds to a predetermined number of frames, from the generation of the CG image frame.

Figure 13:
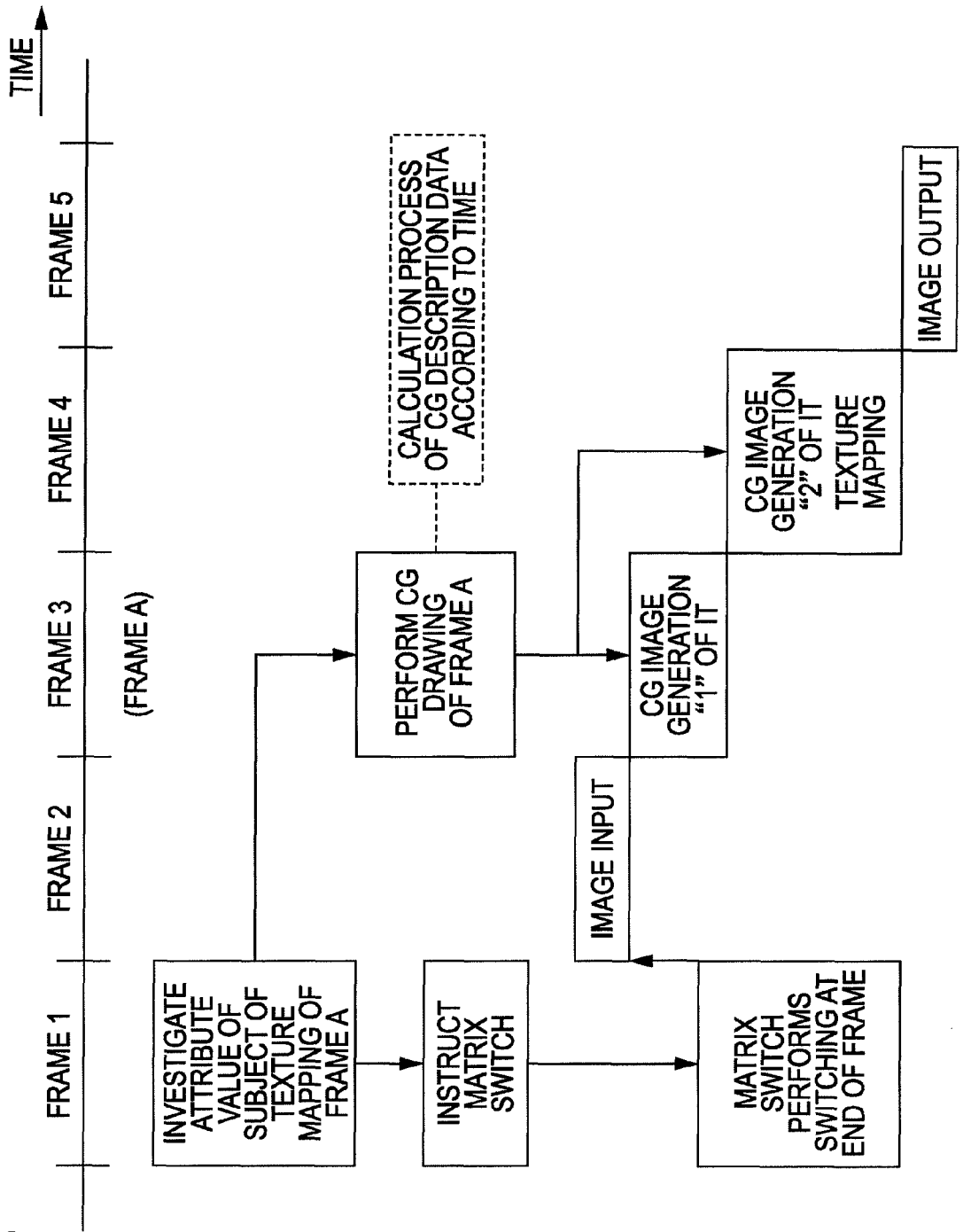
FIG. 13 is a diagram illustrating an operation timing of each processing for texture mapping.
Figure 14A:
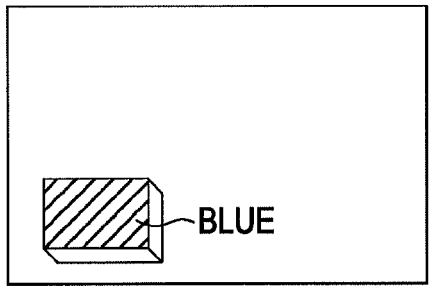
FIGS. 14A to 14H are diagrams illustrating an example of moving images of animation which are shown when a manipulator confirms an animation operation during CG description data preparation.
Figure 14B:
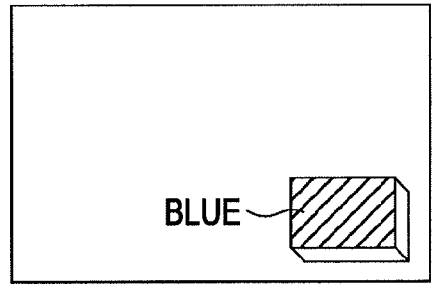
Figure 14C:
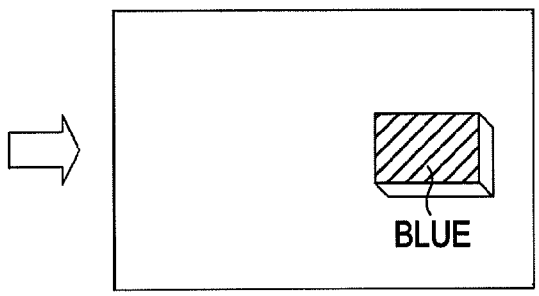
Figure 14D:
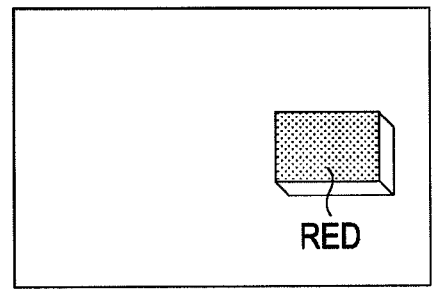
Figure 14E:
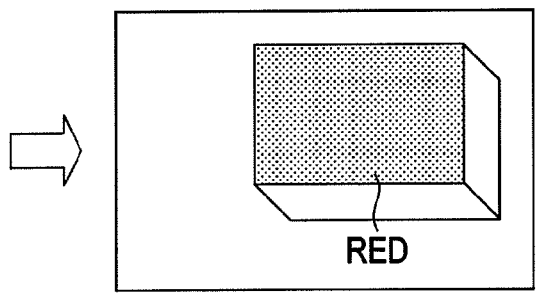
Figure 14F:
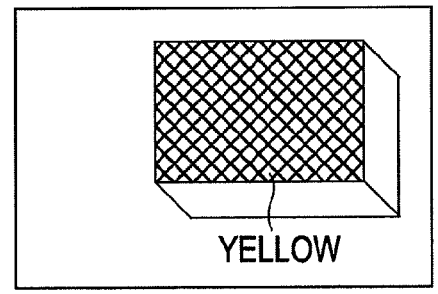
Figure 14G:
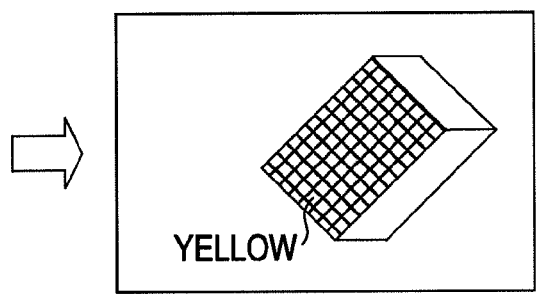
Figure 14H:
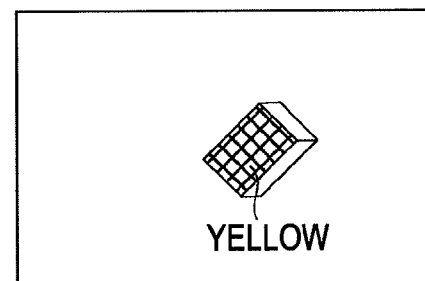
Figure 15A:
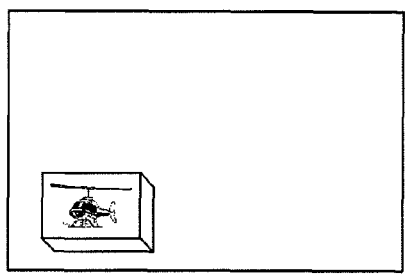
FIGS. 15A to 15H are diagrams illustrating texture-mapped images which are changed whenever an attribute of the target of texture mapping is changed.
Figure 15B:
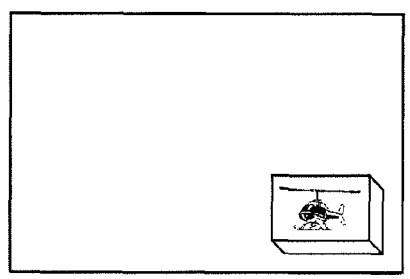
Figure 15C:
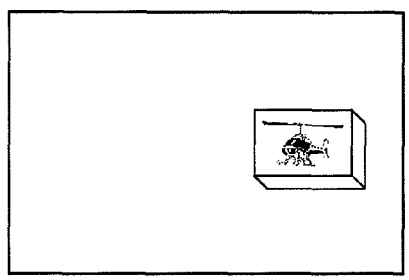
Figure 15D:
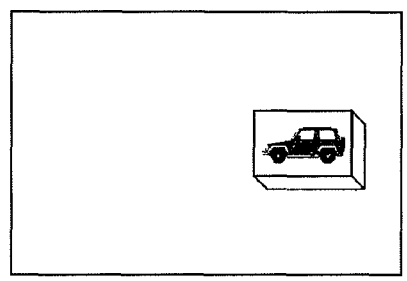
Figure 15E:
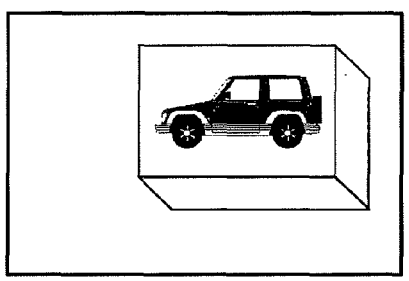
Figure 15F:
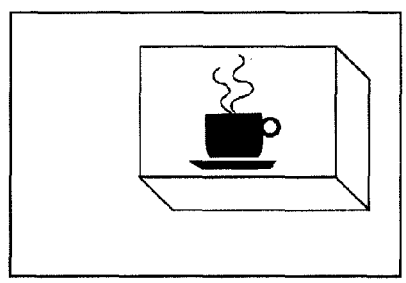
Figure 15G:
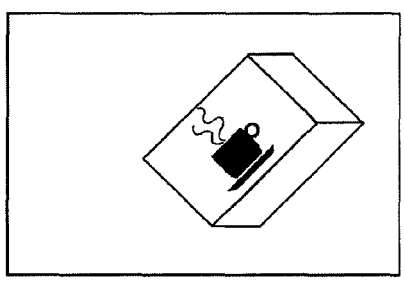
Figure 15H:
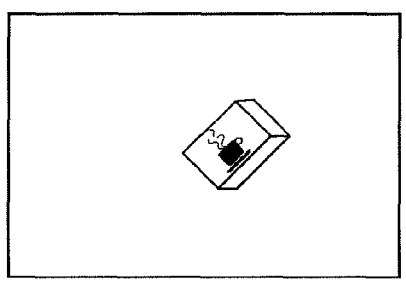

For example, it is assumed that a one-frame time is necessary when generating the CG image and processing the input image, a one-frame time is necessary when texture-mapping the input image, and then the synthesized CG image is output. In this case, for example, a control that is different from the selection of the input image is performed with the timing as illustrated in FIG. 13.

That is, the control unit investigates the value of the attribute given to the target of texture mapping of frame A at frame 1. Then, the control unit, at frame 1, instructs the matrix switch 160 to select the image input according to the attribute value as the image data T1. At the end of frame 1, the matrix switch 160 is switched to select the instructed image input as the image data T1.

Then, the control unit, at frame 2, inputs image data to be texture-mapped onto the CG image that is generated at frame A. That is, at frame 2, one frame of the image data T1 is temporarily stored in the texture image storage unit 153.

Then, the control unit, at frame 3 (frame A), generates the CG image by performing the CG drawing of frame A based on the CG description data, and temporarily stores the image data in the frame buffer 157.

At frame 4, the control unit performs the texture mapping using the image data read from the texture image storage unit 153 as the target of texture mapping of the CG image, and temporarily stores the image data of the CG image after processing in the frame buffer 157.

Then, at frame 5, the control unit reads the image data of the CG image, onto which the input image has been texture-mapped, from the frame buffer 157 to output the read image data.

In this case, the timing as illustrated in FIG. 13 is exemplary, and the time (frame) that is necessary for processing may be further increased. In this case, it is sufficient if the control is made so that the operation timing of the matrix switch 160 is used to generate the CG image to which the image data T1 after the switching can accurately correspond.

In the timing example of FIG. 13, even in the case where the CG drawing at frame 3 has simple contents, and is ended in a short time with respect to one frame time, even the texture mapping is not performed during frame 3 in order to keep the processing timing, but the processing is performed in the predetermined timing for each frame as illustrated.

In the image processing apparatus 100 as illustrated in FIG. 1, the image according to the image data T1 that is extracted from the matrix switch 160 is texture-mapped onto the surface of the target of texture mapping. Also, the image data extracted from the matrix switch 160 is controlled according to the attribute given to the target of texture mapping among the CG description data. Accordingly, the switching timing of the image to be texture-mapped can be easily designated during the CG production by changing the attribute that is given to the target of texture mapping. Although the proceeding speed of the animation operation can be designated during the operation, the image to be texture-mapped can be switched at a time position of the animation operation designated during the CG production by performing the control in the timing according to the frame as illustrated in FIG. 13 even in the case of both early processing and later processing.

In order to confirm the animation operation while the CG description data is prepared by software on the PC, a manipulator may prepare a moving image of the animation by a simple rendering and so on and see the moving image with his/her eyes. In this case, if colors of the respective surfaces are changed, the manipulator can easily recognize such change. According to the image processing apparatus 100 as illustrated in FIG. 1, the color change (attribute change) corresponds to the image input that is texture-mapped. Accordingly, it becomes possible for the manipulator to easily imagine the shape corresponding to the switching of the texture mapping although the texture mapping is not performed during the preparation of the CG description data.

FIGS. 14A to 14H illustrate an example of moving images of animation which are shown when a manipulator confirms an animation operation during CG description data preparation. This example shows shapes in that the color of the surface of the CG image object, which is the target of texture mapping, is changed.

Here, for example, it is assumed that "blue" corresponds to "image input of a helicopter", "red" corresponds to "image input of a car", and "yellow" corresponds to "image input of a coffee cup", respectively. In this case, it is possible that a manipulator easily imagines the shape corresponding to the switching of the texture mapped image as illustrated in FIGS. 15A to 15H. Although the image input is a moving image, FIGS. 15A to 15H illustrate simple still images. The contents of a moving image during the actual operation differ by operations.

In the image processing apparatus 100 as illustrated in FIG. 1, if the attribute value that is given to the target of texture mapping coincides with the value that exists in the image assignment table or is within a predetermined range of the value, the texture mapped image becomes a predetermined image. That is, in this case, under the control of the image selection control unit 180, the image data T1 which is output from the matrix switch 160 and is supplied to the image mapping unit 150 becomes the image input that corresponds to the attribute value thereof.

Although not described above, a manipulator can voluntarily switches the image input which is the image data T1 by manipulation of the press buttons of the manipulator's image selection manipulation unit (manipulation table) 170 (see FIG. 3). In this case, the manipulator can compulsorily switch the image data which is selected by the matrix switch 160 as the image data T1. That is, even if there is no change of the attribute value that is given to the target of texture mapping, the image that is mapped onto the target of texture mapping can be changed to a desired image in an arbitrary timing.

2. Second Embodiment

[Configuration of an Image Processing Apparatus]

Figure 16:
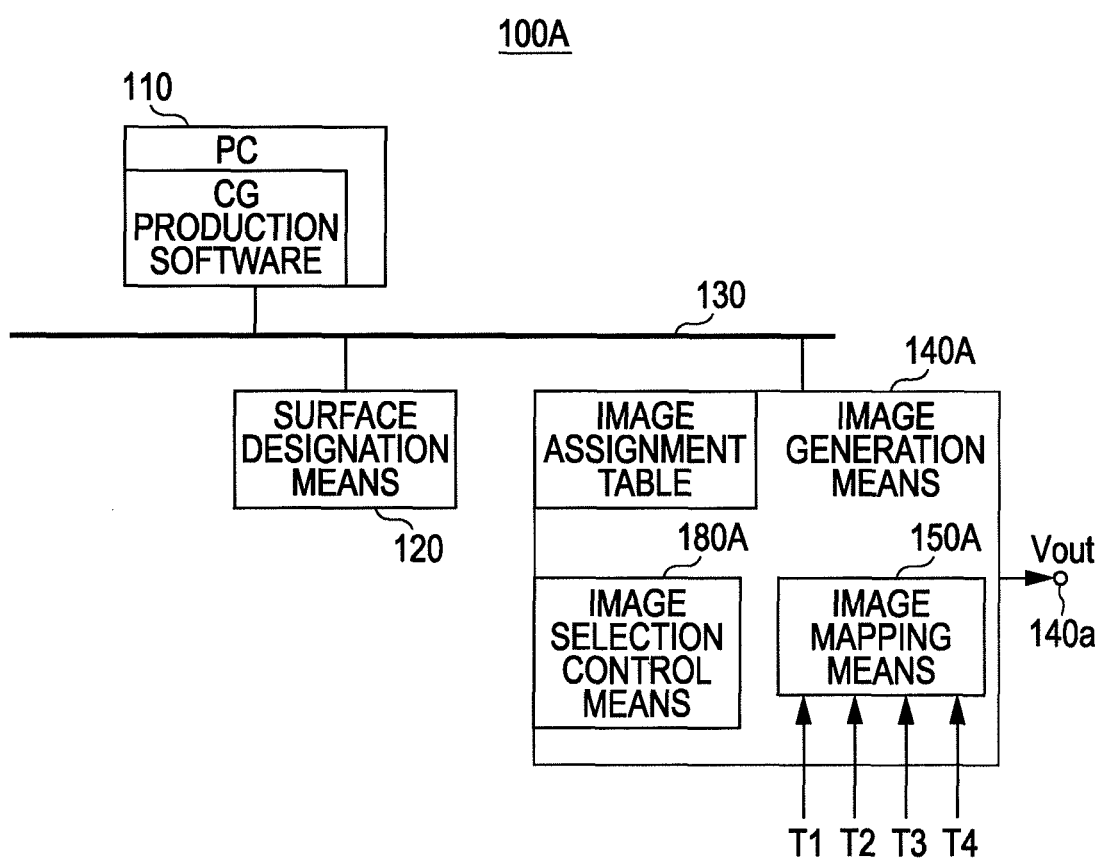
FIG. 16 is a block diagram illustrating a configuration example of an image processing apparatus according to a second embodiment of the invention.

The second embodiment of the present invention will be described. FIG. 16 illustrates a configuration of an image processing apparatus 100A according to the second embodiment. In FIG. 16, the same reference numerals are given to the portions corresponding to those in FIG. 1, and the description thereof will be appropriately omitted. The image processing apparatus 100A includes a CG production means 110, a surface designation unit 120, a network 130, an image generation unit 140A, an image mapping unit 150A, and an image selection control unit 180A. The CG production unit 110, the surface designation unit 120, and the image generation unit 140A are connected to the network 130, respectively.

The CG production unit 110 is configured by a PC (Personal Computer) having CG production software. The CG production unit 110 outputs CG description data of a predetermined format. The CG production unit 110 is the same as the CG production unit 110 of the image processing apparatus 100 as illustrated in FIG. 1.

The surface designation unit 120 designates the target of texture mapping (an object of CG or a portion of the object) for texture-mapping the input image, and sends the designation information to the image generation unit 140A through the network 130. Also, the surface designation unit 120 generates the correspondence relationship between the respective attribute values given to the target of texture mapping among the CG description and the image data, and sets the image assignment table that indicates the correspondence relationship in the image generation unit 140A. The surface designation unit 120 is the same as the surface designation unit 120 of the image processing apparatus 100 as illustrated in FIG. 1 as described above.

The image generation unit 140A generates a CG image that is a 3D space image based on the CG description data that is produced by the CG production unit 110. Also, the image generation unit 140A controls the image mapping unit 150A to perform the texture mapping of the input image onto the surface of the target of texture mapping based on the designation information of the target of texture mapping that is sent from the surface designation unit 120.

The image mapping unit 150A performs the texture mapping of the input image onto the surface of the target of texture mapping that is designated by the surface designation unit 120 among the CG drawn by the image generation unit 140A. The image mapping unit 150A is packaged in a body with the image generation unit 140A. The image mapping unit 150A is realized by the control through software on the CPU and the hardware operation of the GPU or the like. The control software designates the polygon sets to be texture-mapped and instructs the hardware.

The image selection control unit 180A controls the image data that is actually used among the plurality of image data input to the image mapping unit 150A in accordance with the attribute given to the target of texture mapping among the CG description data. In the embodiment of the present invention, four system image data T1 to T4 have been input to the image mapping unit 150A, and one image data is selectively used as the image data for the texture mapped image. The image selection control unit 180A is packaged in a body with the image generation unit 140A.

The image selection control unit 180A controls the image data that is used in the image mapping unit 150A based on the image assignment table set in the image generation unit 140 as described above.

For example, if the image assignment table that is set in the image generation unit 140A is the image assignment table as illustrated in FIG. 8, the following control is performed. That is, if the value of the "attribute m" that is given to the target of texture mapping among the CG description data becomes p1, the image data T1 is used. Also, if the value of the "attribute m" that is given to the target of texture mapping among the CG description data becomes p2, the image data T2 is used.

Figure 17:
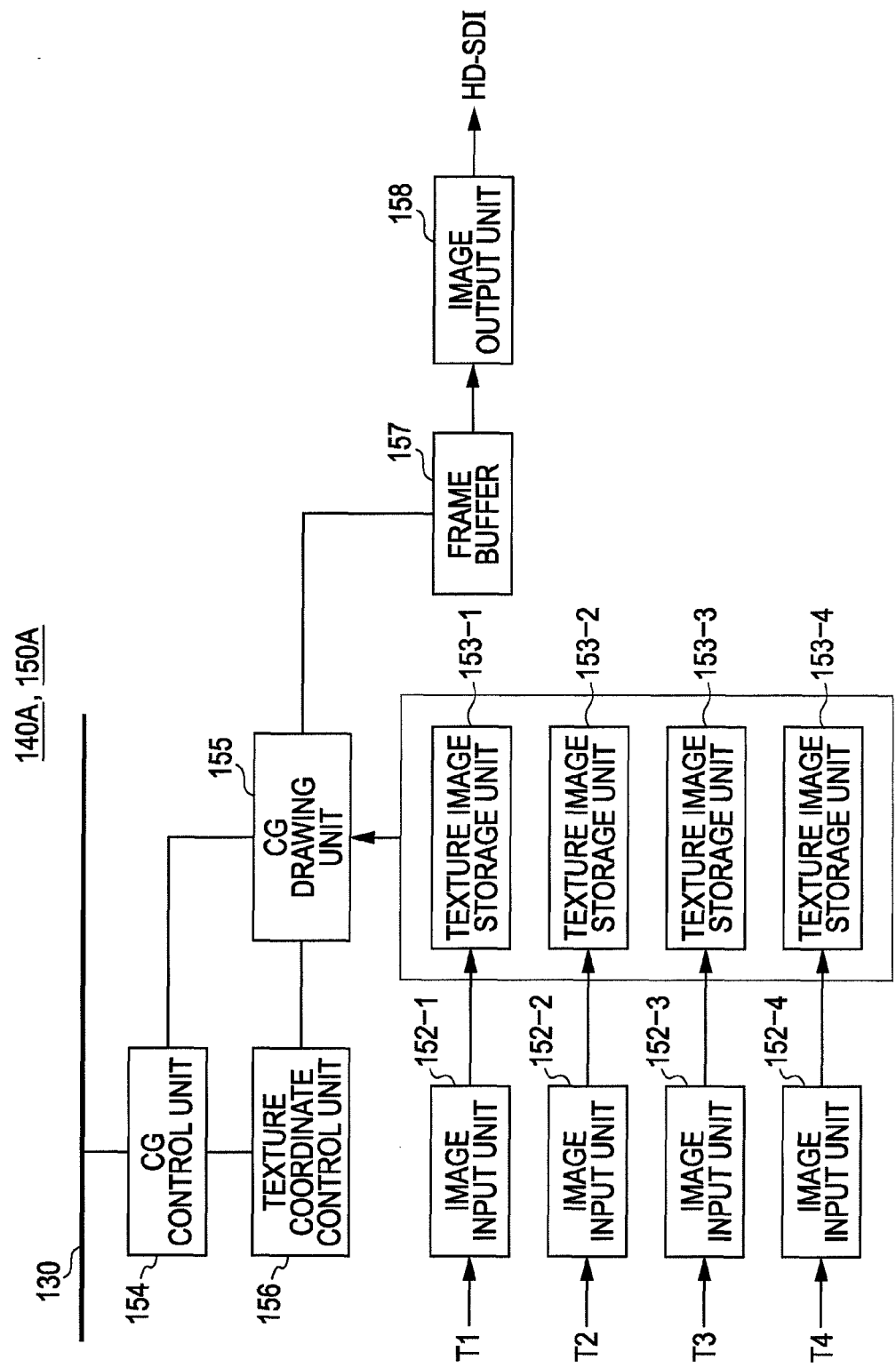
FIG. 17 is a diagram illustrating a configuration example of function blocks of an image generation unit and an image mapping unit.

FIG. 17 illustrates a configuration example of function blocks of the image generation unit 140A and the image mapping unit 150A. In FIG. 17, the same reference numerals are given to the portions corresponding to the portions of FIG. 5. The units 140A and 150A have the function blocks of image input units 152-1 to 152-4, texture image storage units 153-1 to 153-4, a CG control unit 154, a CG drawing unit 155, a texture coordinate control unit 156, a frame buffer 157, and an image output unit 158.

The image input units 152-1 to 152-4 and the image output unit 158 are configured by the image input/output unit 141. Also, the texture image storage units 153-1 to 153-4 are configured by the main memory 145. Also, the CG control unit 154 and the texture coordinate control unit 156 are configured by the CPU 144. Also, the CG drawing unit 155 is configured by the GPU 142. Also, the frame buffer 157 is configured by the local memory 143.

The image input unit 152-1 and the texture image storage unit 153-1 correspond to the input system of the image data T1, and the image input unit 152-2 and the texture image storage unit 153-2 correspond to the input system of the image data T2. The image input unit 152-3 and the texture image storage unit 153-3 correspond to the input system of the image data T3, and the image input unit 152-4 and the texture image storage unit 153-4 correspond to the input system of the image data T4. In the image mapping unit 150A, one of the image data T1 to T4 stored in the texture image storage units 153-1 to 153-4 is selectively used as the image data for texture mapping.

Operation Example of an Image Processing Apparatus

The operation example of the image processing apparatus 100A as illustrated in FIG. 16 will be described. The CG production unit 110 generates the CG description data for generating a predetermined CG image by the CG production software. The CG description data generated in the CG production unit 110 is sent to the image generation unit 140A and the surface designation unit 120 through the network 130.

In the surface designation unit (GUI) 120, an object or a portion of the object among the CG description data becomes a selection, and the target of texture mapping for texture-mapping the input image is designated by a manipulator's manipulation. This designation information is sent from the surface designation unit 120 to the image generation unit 140. Also, the surface designation unit 120 generates the correspondence relationship between each value of attribute, which is given to the target of texture mapping among the CG description data by the manipulator's manipulation, and the image data. Also, the surface designation unit 120 sets the image assignment table that indicates the correspondence relationship in the image generation unit 140A.

The image generation unit 140A generates the CG image that is a 3D space image based on the CG description data produced by the CG production unit 110. Also, as described above, the designation information of the object that is the target of texture mapping or a portion of the object is sent from the surface designation unit 120 to the image generation unit 140A. The image generation unit 140A controls the image mapping unit 150A to perform the texture mapping of the input image onto the surface of the target of texture mapping.

The image mapping unit 150A, under the control of the image generation unit 140A, performs the texture mapping of the input image onto the surface of the target of texture mapping. From an output terminal 140a of the image generation unit 140A, image data Vout of the CG image after the texture mapping is output.

Here, four system image data T1 to T4 are input to the image mapping unit 150A. The image data actually used in the image mapping unit 150A becomes any one of the image data T1 to T4 through the image selection control unit 180A. In this case, for example, the image generation unit 140A monitors attribute values which are given to the target of texture mapping among the CG description data produced by the CG production unit 110. Also, the image generation unit 140A compares the attribute values with the values in the image assignment table set by the surface designation unit 120, and sends a control signal to the image selection control unit 180A in accordance with the result of comparison.

Then, the image selection control unit 180A controls the image data that is actually used among the four system image data T1 to T4 input to the image mapping unit 150A. That is, if the attribute value coincides with the value in the image assignment table or the attribute value is within a predetermined range with respect to the value in the image assignment table, the image mapping unit 150A uses the image data corresponding to the value.

For example, if the image assignment table as illustrated in FIG. 8 is set in the image generation unit 140A, the following operation is performed. When the value of the "attribute m" that is given to the target of texture mapping becomes p1, the image mapping unit 150A is switched to use the image data T1. Accordingly, in the image mapping unit 150A, the image according to the image data T1 is texture-mapped onto the surface of the target of texture mapping. Also, when the value of the "attribute m" that is given to the target of texture mapping becomes p2, the image mapping unit 150A is switched to use the image data T2. Accordingly, in the image mapping unit 150A, the image according to the image data T2 is texture-mapped onto the surface of the target of texture mapping.

Figure 18:
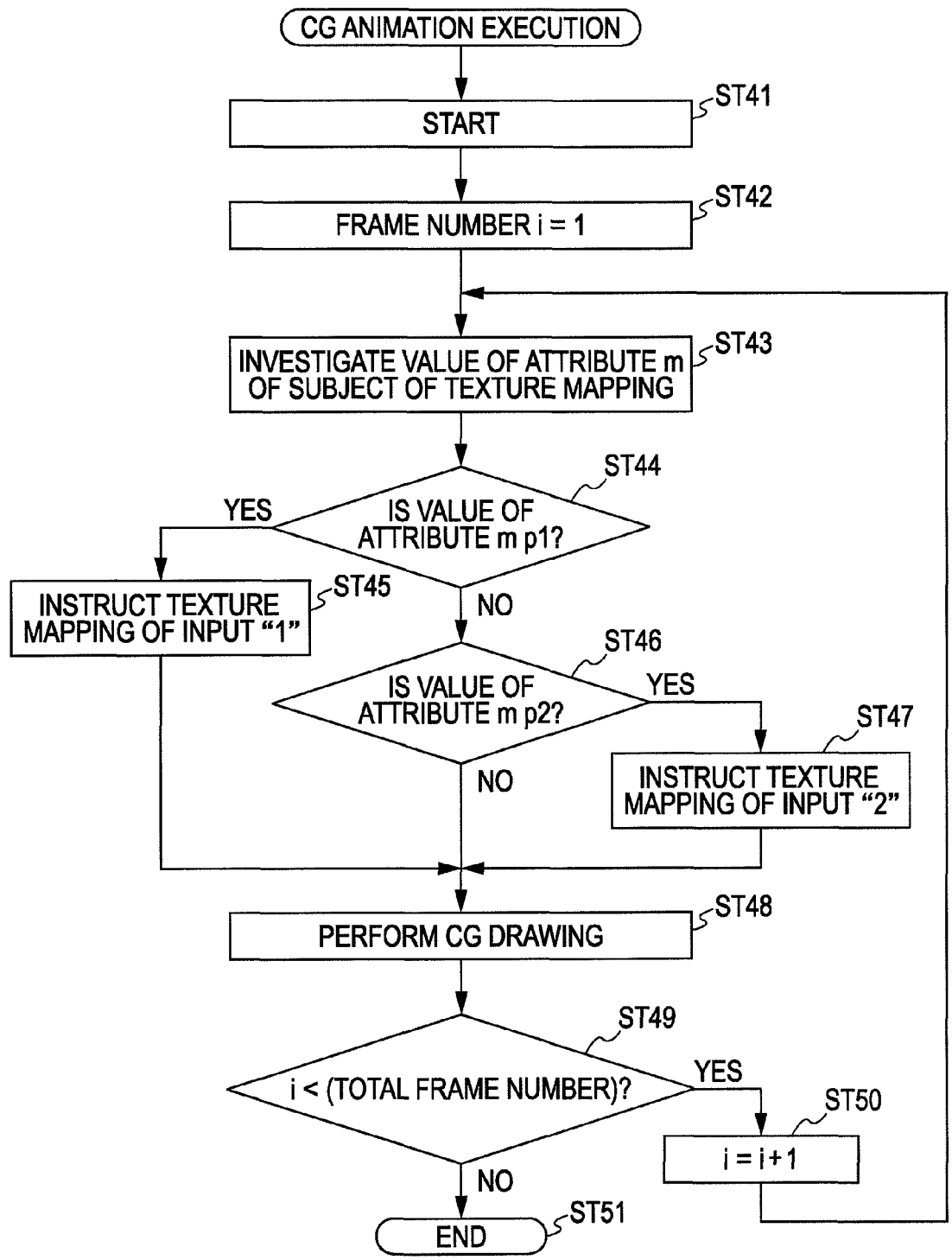
FIG. 18 is a flowchart illustrating a processing example of a control unit of an image generation unit and an image selection control unit during CG animation execution.

The flowchart of FIG. 18 shows a processing example of a control unit of the image generation unit 140A and the image selection control unit 180A during the execution of the CG animation. In this processing example, it is assumed that the image generation unit 140A and the image selection control unit 180A are controlled by a common control unit (CPU). Also, in this processing example, it is assumed that the image assignment table as illustrated in FIG. 8 is set in the image generation unit 140A.

The control unit starts the processing according to the execution of the CG animation in step ST41. The control unit sets a frame number i to "1" in step ST42. Also, in step ST43, the control unit investigates the value of the attribute m that is given to the target of texture mapping, and proceeds to step ST44.

In step ST44, the control unit judges whether the value of the attribute m is p1. If the value of the attribute m is p1, the control unit instructs the image mapping unit 150A to perform the texture mapping using the image data T1 (input "1") in step ST45. Also, if the value of the attribute m is not p1, the control unit proceeds to step ST46.

In step ST46, the control unit judges whether the value of the attribute m is p2. If the value of the attribute m is p2, the control unit instructs the image mapping unit 150A to perform the texture mapping using the image data T2 (input "2") in step ST47. Also, if the value of the attribute m is not p2, the control unit proceeds to step ST48.

After the processing in step ST45 or ST47, the control unit proceeds to step ST48. In step ST48, the control unit performs the CG drawing. Then, the control unit proceeds to step ST49.

In step ST49, the control unit judges whether the frame number i is equal to or smaller than the total number of frames. If the frame number i is equal to or smaller than the total number of frames, the control unit increments the frame number i in step ST50, and then returns to the processing of step ST43 to proceed to the processing of the next frame. In step ST49, if frame number i is larger than the total number of frames, the control unit ends the processing in step ST51. That is, the animation is ended.

Figure 19:
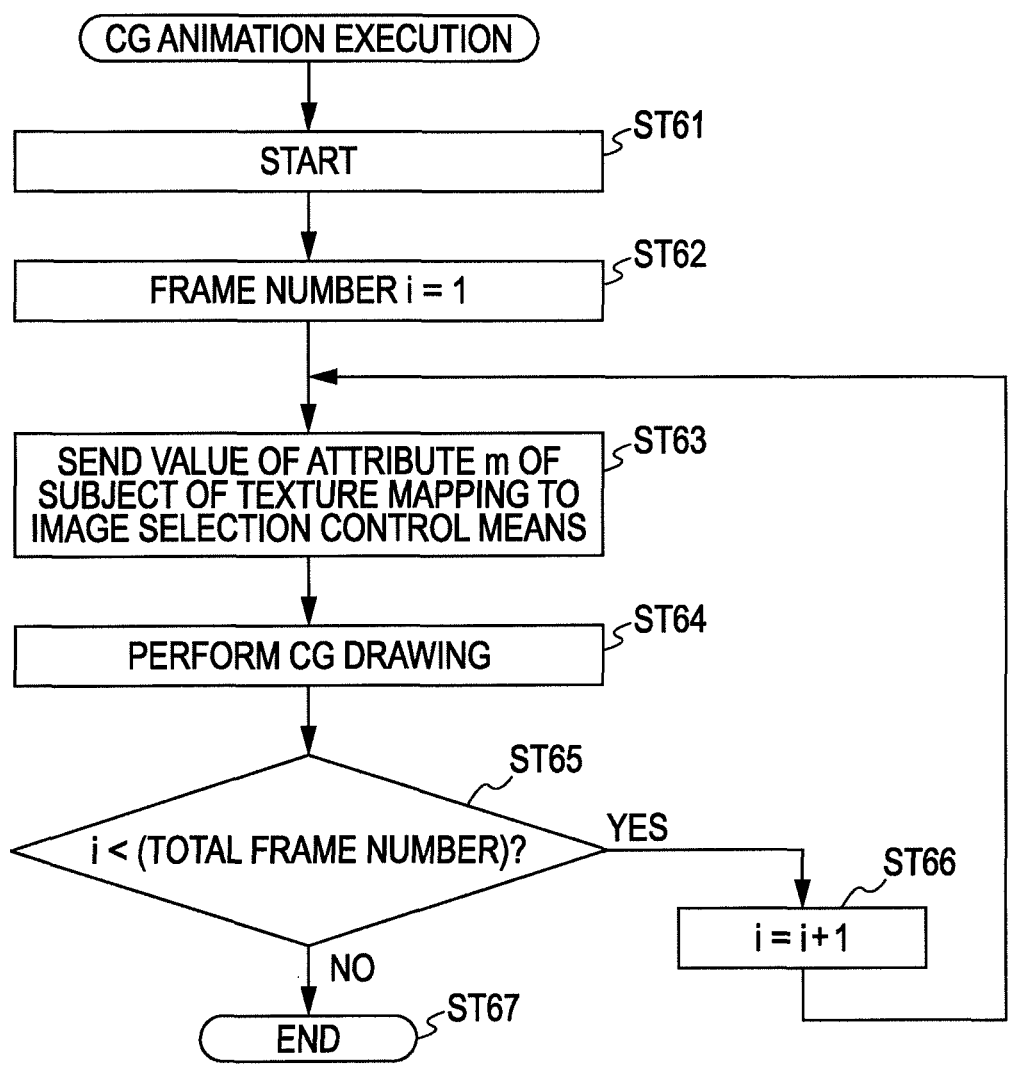
FIG. 19 is a flowchart illustrating a processing example of a control unit of an image generation unit during CG animation execution.
Figure 20:
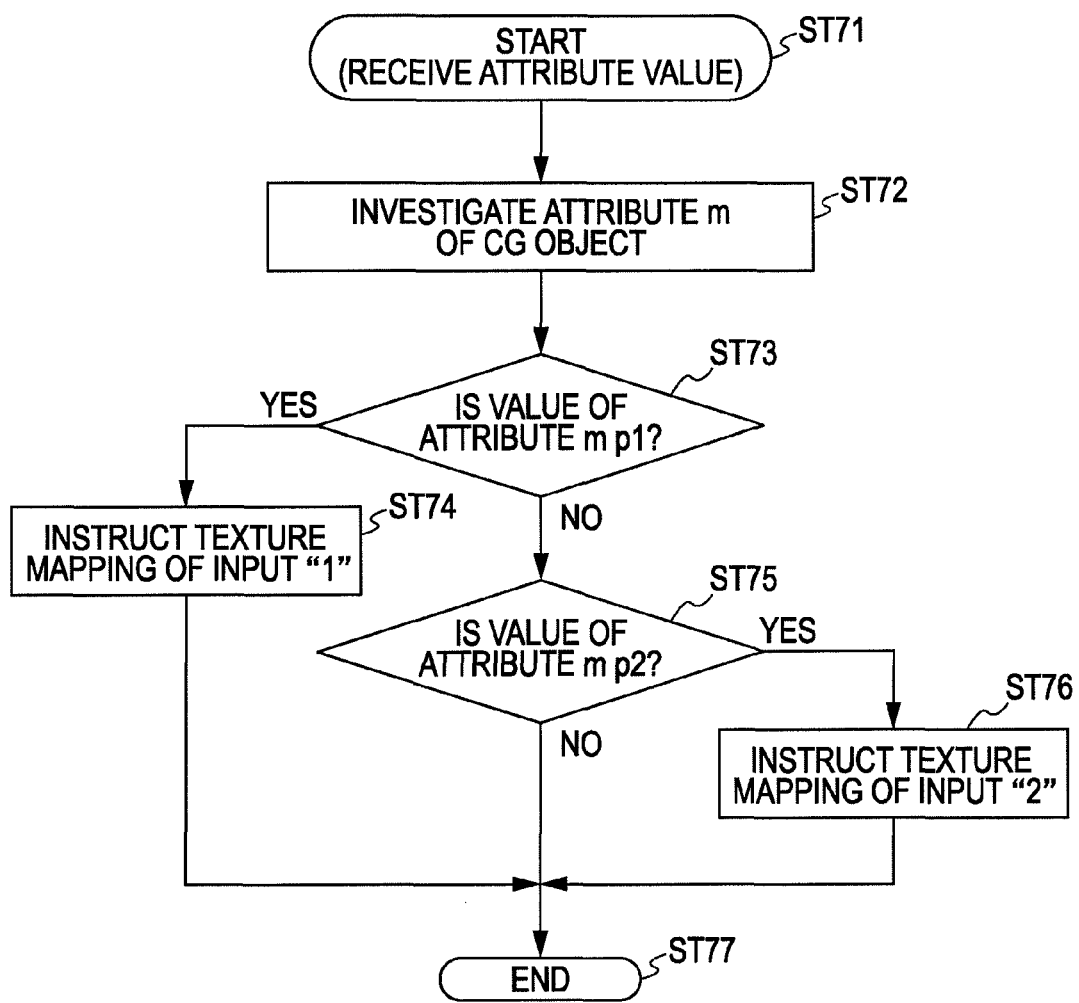
FIG. 20 is a flowchart illustrating a processing example of a control unit of an image selection control unit during CG animation execution.

The flowchart of FIG. 19 shows a processing example of the control unit of the image generation unit 140A during the CG animation execution. The flowchart of FIG. 20 shows a processing example of the control unit of the image selection control unit 180A during the CG animation execution. In these processing examples, it is assumed that the image generation unit 140A and the image selection control unit 180A are controlled by a separate control unit CPU. Also, in these processing examples, it is assumed that the image assignment table as illustrated in FIG. 8 has been set in the image generation unit 140A.

Based on the flowchart of FIG. 19, the processing example of the control unit of the image generation unit 140A will be described. In step ST61, the control unit starts the processing in accordance with the execution of the CG animation. The control unit sets the frame number i to "1" in step ST62, and transfers the value of the attribute m that has been given to the target of texture mapping to the image selection control unit 180A in step ST63. Then, the control unit performs the CG drawing in step ST64.

In step ST65, the control unit judges whether the frame number i is equal to or smaller than the total number of frames. If the frame number i is equal to or smaller than the total number of frames, the control unit increments the frame number i in step ST66, and then returns to the processing of step ST63 to proceed to the processing of the next frame. In step ST65, if frame number i is larger than the total number of frames, the control unit ends the processing in step ST67. That is, the animation is ended.

Based on the flowchart of FIG. 20, the processing example of the control unit of the image selection control unit 180A will be described. In step ST71, the control unit starts the processing by receiving the value of the attribute m. Then, the control unit proceeds to the processing of step ST72. In step ST72, the control unit investigates the value of the attribute m that has been given to the target of texture mapping.

Then, in step ST73, the control unit judges whether the value of the attribute m is p1. If the value of the attribute m is p1, the control unit instructs the image mapping unit 150A to perform the texture mapping using the image data T1 (input "1") in step ST74. After the processing of step ST74, the control unit ends the processing in step ST77.

Also, if the value of the attribute m is not p1 in step ST73, the control unit judges whether the value of the attribute m is p2 in step ST75. If the value of the attribute m is p2, the control unit instructs the image mapping unit 150A to perform the texture mapping using the image data T2 (input "2") in step ST76. After the processing of step ST76, the control unit ends the processing in step ST77. Also, if the value of the attribute m is not p2 in step ST75, the control unit ends the processing in step ST77.

In the image processing apparatus 100A as illustrated in FIG. 16, the image according to one image data selected from the input image data T1 to T4 is texture-mapped onto the surface of the target of texture mapping. Also, the image data that is used in the texture mapping unit 150A is controlled according to the attribute given to the target of texture mapping among the CG description data.

Accordingly, even in the image processing apparatus 100A, in the same manner as the image processing apparatus 100 as illustrated in FIG. 1, the switching timing of the image being texture-mapped can be easily designated during the CG production by changing the attribute that is given to the target of texture mapping.

3. Third Embodiment

[Configuration of an Image Processing Apparatus]

Figure 21:
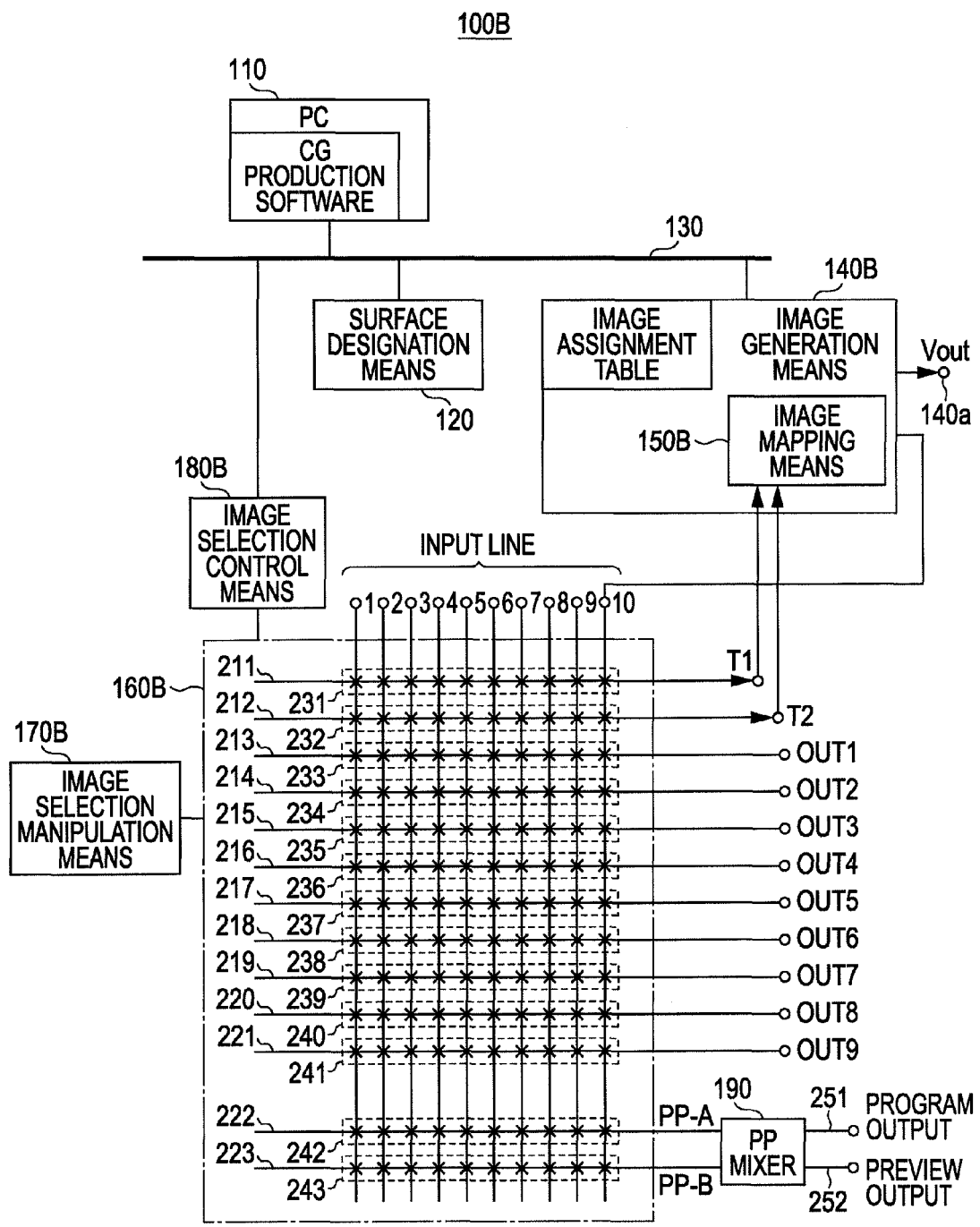
FIG. 21 is a block diagram illustrating a configuration example of an image processing apparatus according to a third embodiment of the invention.

The third embodiment of the present invention will be described. FIG. 21 illustrates a configuration of an image processing apparatus 100B according to the third embodiment. In FIG. 21, the same reference numerals are given to the portions corresponding to those in FIG. 1, and the description thereof will be appropriately omitted. The image processing apparatus 100B includes a CG production unit 110, a surface designation unit 120, a network 130, an image generation unit 140B, and an image mapping unit 150B. Also, the image processing apparatus 100B includes a matrix switch 160B, an image selection manipulation unit 170B, and an image selection control unit 180B, and a program preview mixer 190. The CG production unit 110, the surface designation unit 120, the image generation unit 140B, and the image selection control unit 180B are connected to the network 130, respectively.

The CG production unit 110 is configured by a PC (Personal Computer) having CG production software. The CG production unit 110 outputs CG description data of a predetermined format. The CG production unit 110 is the same as the CG production unit 110 of the image processing apparatus 100 as illustrated in FIG. 1.

The matrix switch 160B constitutes the image selection unit for selectively extracting image data from a plurality of input image data. The matrix switch 160B is composed of 10 input lines, 13 output bus lines 211 to 223, and cross-point switch groups 231 to 243. The matrix switch 160B constitutes a portion of an effect switcher, and is used to supply the image data to the image mapping unit 150B as an external device and to supply the image data to an internal image synthesis unit or the like.

The output bus line 211 and 212 are bus lines for supplying the image data to the image mapping unit 150B. Also, the output bus lines 213 to 221 are bus lines for outputting the image data to the outside. Also, the output bus lines 222 and 223 are bus lines for supplying the image data to an internal image synthesis unit (mixer).

The 10 input lines are arranged in one direction. To the input lines "1" to "9", the image data from a VTR, a video camera, and the like, is input. To the input line "10", the CG image data output from the image generation unit 140B is input. The 13 output bus lines 211 to 223 are arranged in a different direction, crossing the input lines.

The cross-point switch groups 231 and 232 perform connections at cross points where the 10 input lines and the output bus lines 211 and 212 cross each other. The connections of the cross-point switch groups 231 and 232 are controlled based on the control of the image selection control unit 180B or manipulator's image selection manipulation, and any one of image data input to the 10 input lines is selectively output to the output bus lines 211 and 212. The output bus lines 211 and 212 configure output lines of the image data T1 and T2 for texture mapping.

Also, the cross-point switch groups 233 to 241 perform connections at cross points where the 10 input lines and the output bus lines 213 to 221 cross each other. The cross-point switch groups 233 to 241 are controlled based on the manipulator's image selection manipulation, and any one of image data input to the 10 input lines is selectively output to the output bus lines 213 to 221. The output bus lines 213 to 221 configure output lines of image data OUT1 to OUT9 for external output.

Also, the cross-point switch groups 242 and 243 perform connections at cross points where the 10 input lines and the output bus lines 222 and 223 cross each other. The cross-point switch groups 242 and 243 are controlled based on the manipulator's image selection manipulation, and any one of image data input to the 10 input lines is selectively output to the output bus lines 222 and 223.

The image data output from the output bus lines 222 and 223 are input to the program preview mixer 190. This program preview mixer 190 performs synthesis of the image data input from the output bus lines 222, and 223. The program (PGM) output is output from the program preview mixer 190 to the outside through the program output line 251, and the preview output is output to the outside through the preview output line 252.

Also, since the on/off operation of the respective cross-point switches of the cross-point switch groups 231 to 243 is to perform switching of the image data composed of a series of frame data, it is performed within a vertical blanking period that is a gap between frames.

The image selection manipulation unit 170B receives a manipulation input of an instruction to the matrix switch 160B. The image selection manipulation unit 170B is composed of a manipulation table 260 having press button lines for manipulating the on/off operation of the switches of the respective cross-point switch groups of the matrix switch 160B.

Figure 22:
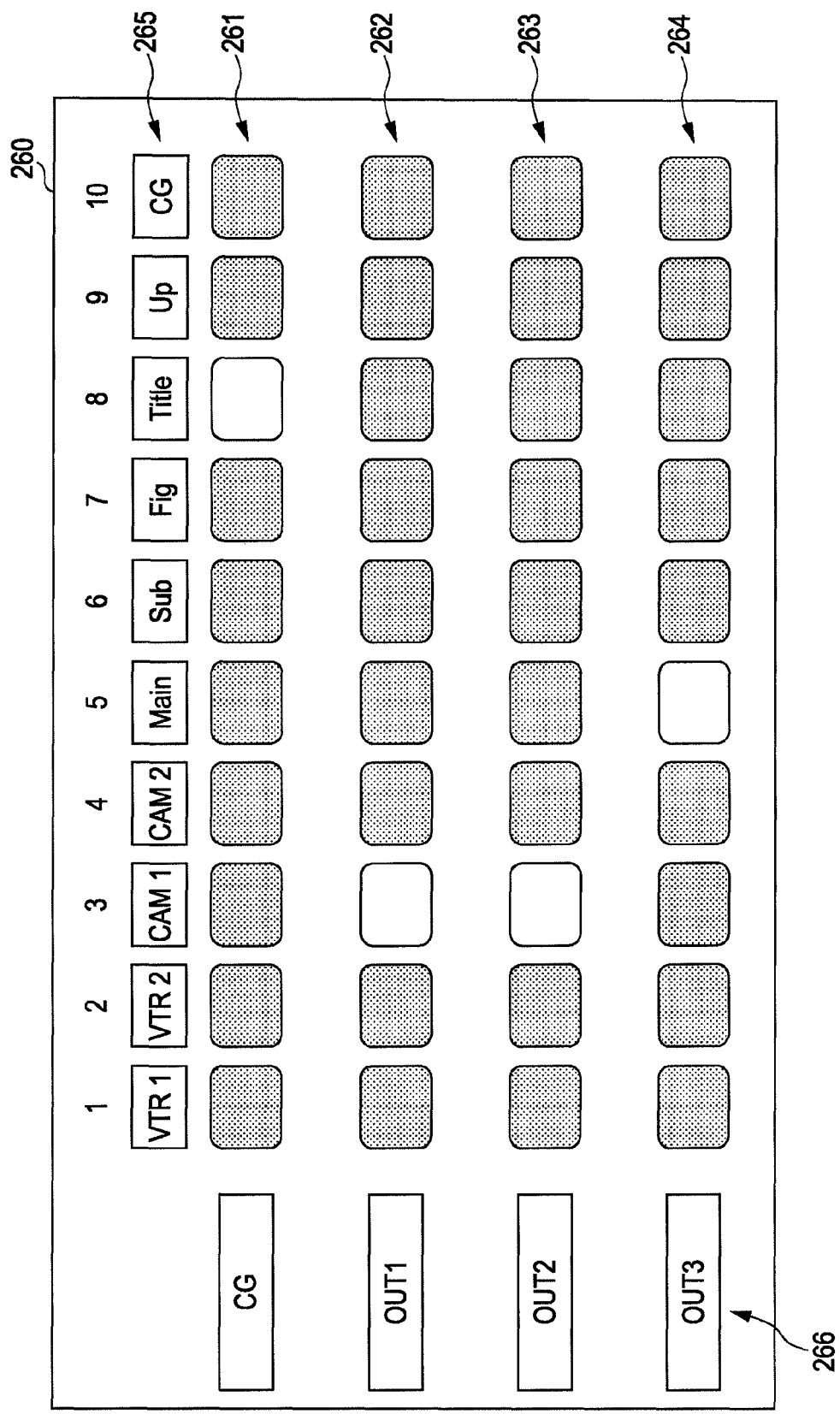
FIG. 22 is a diagram illustrating an external appearance of an example of a manipulation table provided with an image selection manipulation unit.

FIG. 22 illustrates an example of an external appearance of a manipulation table 260. In the manipulation table 260, press button lines 261 to 264, which extend in left and right directions, are installed in order in upward and downward directions. Each press button line is set to correspond to any one of 13 output bus lines of the matrix switch 160B. Each press button line is composed of alternative type press buttons that select connections of the respective input lines to the corresponding output bus lines, and the selected press button lights up.

On an upper part of the manipulation table 260, a character display portion 265 is installed to display characters for identifying input images to the respective input lines. The character display portion 265, for example, may be composed of a display device such as an LCD (Liquid Crystal Display). Also, on a left-side part of the manipulation table 260, a character display portion 266 is installed.

The character display portion 266 displays characters for identifying the output bus lines that correspond to the respective press button lines. The character display portion 266, for example, may be composed of a display device such as an LCD. To correspond to the press button line assigned to the output bus line that supplies the mapping input to the image mapping unit 150B, for example, "CG" is displayed.

Which output bus lines the press button lines 261 to 264 of the manipulation table 260 correspond to is realized by, for example, a GUI (Graphic User Interface). FIG. 23A illustrates an example of GUI display that is displayed during assignment of the output bus lines. In this GUI display, four press button lines 261 to 264 are indicated as "1" to "4". A manipulator displays the selection of the output bus lines by manipulating a "Select button" corresponding to the lines "1" to "4", and selects a desired output bus line from the selection to assign a desired output bus line to the respective press button line.

FIG. 23B illustrates an example of GUI display that is displayed during selection of the output bus line. In this GUI display, the output bus lines 211 and 212 that constitute the output lines of the image data T1 and T2 to the image mapping unit 150B are selected as the selection on "CG". Also, in this GUI display, the output bus lines 213 to 221 that constitute the output liens of the image data OUT1 to OUT9 for external output are displayed as the selection on "OUT1" to "OUT9". Also, in this GUI display, the output bus lines 222 and 223 for inputting the image data to the program preview mixer 190 are displayed as the selection on "PP-A" and "PP-B".

The image generation unit 140B generates a CG image that is a 3D space image based on the CG description data produced by the CG production unit 110. The image generation unit 140B generates an image of an animation frame in real time, rather than a rendering process with time. The image generation unit 140B, when the CG description data is read, maintains information such as respective definitions and their corresponding portions as a data structure in a memory.

The surface designation unit 120 designates the target of texture mapping (an object of CG or a portion of the object) for texture-mapping the input image, and sends the designation information to the image generation unit 140B through the network 130. Also, the surface designation unit 120 generates the correspondence relationship between the respective attribute values given to the target of texture mapping among the CG description and the image data, and sets the image assignment table that indicates the correspondence relationship in the image generation unit 140B. The surface designation unit 120 is the same as the surface designation unit 120 of the image processing apparatus 100 as illustrated in FIG. 1 as described above.

The image generation unit 140B generates a CG image that is a 3D space image based on the CG description data that is produced by the CG production unit 110. Also, the image generation unit 140B controls the image mapping unit 150B to perform the texture mapping of the input image onto the surface of the target of texture mapping based on the designation information of the target of texture mapping that is sent from the surface designation unit 120.

The image mapping unit 150B performs the texture mapping of the input image onto the surface of the target of texture mapping that is designated by the surface designation unit 120 among the CG drawn by the image generation unit 140B. The image mapping unit 150B is packaged in a body with the image generation unit 140B, and is realized by the control through software on the CPU and the hardware operation of the GPU or the like. The control software designates the polygon sets to be texture-mapped and instructs the hardware. The image mapping unit 150B and the image generation unit 140B are configured in the same manner as the image mapping unit 150 and the image generation unit 140 in the image processing apparatus 100 as illustrated in FIG. 1 (see FIGS. 4 and 5).

The image selection control unit 180B controls the image data T1 and T2 selected by the matrix switch 160B in accordance with the attribute given to the target of texture mapping among the CG description data. The image data T1 and T2 are image data for texture mapping that are selectively output to the output bus lines 211 and 212. The image selection control unit 180B controls the image data T1 and T2 that are selected by the matrix switch 160B based on the image assignment table set by the image generation unit 140B.

FIG. 24 illustrates a configuration example of function blocks of the image generation unit 140B and the image mapping unit 150B. In FIG. 24, the same reference numerals are given to the portions corresponding to the portions of FIG. 5. The unit 140B and 150B have the function blocks of image input units 152-1 and 152-2, texture image storage units 153-1 and 153-2, a CG control unit 154, a CG drawing unit 155, a texture coordinate control unit 156, a frame buffer 157, and an image output unit 158.

The image input units 152-1 and 152-2 and the image output unit 158 are configured by the image input/output unit 141. Also, the texture image storage units 153-1 and 153-2 are configured by the main memory 145. Also, the CG control unit 154 and the texture coordinate control unit 156 are configured by the CPU 144. Also, the CG drawing unit 155 is configured by the GPU 142. Also, the frame buffer 157 is configured by the local memory 143.

The image input unit 152-1 and the texture image storage unit 153-1 correspond to the input system of the image data T1, and the image input unit 152-2 and the texture image storage unit 153-2 correspond to the input system of the image data T2. In the image mapping unit 150B, one of the image data T1 and T2 stored in the texture image storage units 153-1 and 153-2 is selectively used as the image data for texture mapping.

In the image processing apparatus 100B as illustrated in FIG. 21, the image data T1 and T2 input to the image mapping unit 150B are stored in the texture image storage units 153-1 and 153-2 (see FIG. 24). Accordingly, when the image mapping unit 150B reads the image data input to the texture image storage units 153-1 and 153-2, it is possible to perform the switching of the image input.

That is, in the case where the current image data T1 is used for texture mapping, the animation of the CG description data is pre-investigated, preceding the drawing for several frames. Then, the matrix switch 160 is instructed so that the image input (any one of image inputs "1" to "10") selected by the switching is output as the image data T2. Then, the image data for the texture mapping is switched from the image data T1 to the image data T2 in a predetermined timing in the image mapping unit 150B.

FIG. 25 illustrates an example of control timing, and in this timing, the input image selection and other controls are performed. In this case, the image data T1 is used for the texture mapping.

The control unit investigates the value of the attribute given to the target of texture mapping of frame A at a frame that precedes the frame A for several frames. Then, the control unit instructs the matrix switch 160 to select the image input according to the attribute value as the image data T2. At the end of the frame, the matrix switch 160 is switched to select the instructed image input as the image data T2. Accordingly, in the texture image storage unit 153-2 (see FIG. 24) that corresponds to the image data T2, the instructed image input is stored.

Then, the control unit, at frame 3 (frame A), switches the image data that is used for the texture mapping from the image data T1 to the image data T2 based on the CG description data. That is, since the image data that is used for the texture mapping is read from the texture image storage unit 153-1, the switching is performed so as to read the data from the texture image storage unit 153-2. Also, the control unit, at frame 3 (frame A), generates the CG image by performing the CG drawing of frame A, and temporarily stores the image data in the frame buffer 157.

Then, the control unit, at frame 4, performs the texture mapping using the image data read from the frame 3 as the target of texture mapping of the CG image generated from frame 3, and temporarily stores the image data of the CG image after processing in the frame buffer 157.

Then, the control unit, at frame 5, reads the image data of the CG image, onto which the input image has been texture-mapped, from the frame buffer 157 to output the read image data.

According to the control timing as illustrated in FIG. 25, the following advantages can be obtained. In the case of a control change such as stopping of the animation operation, it is necessary to stop the animation operation at a time point where the selection of the image and the use of the selected image in the CG drawing are completed after the stop instruction is received. If the animation operation is stopped at the time point where only the selection of the image is completed, the stopped animation CG has not yet reached the frame at which the image switching is intended, and thus the texture mapped image and the CG construction do not accurately coincide with each other. In the case of the control timing as illustrated in FIG. 25, the number of frames from the selection of the image to the use of the CG is reduced in comparison to the control timing as illustrated in FIG. 13, and thus the reaction on the control change such as stop and so on occurs in a short time. Also, the image selection and the CG drawing are controlled by the same CPU. As a result, the reaction is good, the consistency is easily maintained, and the manipulation is improved.

Although the detailed explanation has been omitted, other operations of the image processing apparatus 100B as illustrated in FIG. 21 are the same as those of the image processing apparatus 100 as illustrated in FIG. 1. Accordingly, the same effect as that of the image processing apparatus 100 as illustrated in FIG. 1 can be obtained through the image processing apparatus 100B as illustrated in FIG. 21.

Also, the image processing apparatus 100B as illustrated in FIG. 21 is configured so that the image data T1 and T2 output to the two output bus lines 211 and 212 of the matrix switch 160B are input to the image mapping unit 150B. However the number of image data input from the matrix switch 160B to the image mapping unit 150B is not limited two, and three or more or two pairs of image data may also be used.

4. Modifications

In the above-described embodiments, the correspondence relationship between the respective attribute value and the image data is generated by the surface designation unit 120, and the image assignment table that indicates the correspondence relationship is set in the image generation units 140, 140A, and 140B. Also, when the attribute value given to the target of texture mapping among the CG description data coincides with the attribute value that exists in the image assignment table or is within a predetermined range, the image data for the texture mapping is switched to that corresponding to the attribute value.

However, in the case where the correspondence relationship between the respective attribute value and the image data is not pre-determined, but the attribute value given to the target of texture mapping among the CG description data is changed simply, a configuration that switches the image data for texture mapping may be considered. In this case, the switching order of the image data may be predetermined or may be randomly switched.

Also, for example, in the configuration example of FIG. 21, the texture mapping may be performed by alternately switching the image data T1 and T2, and the operation of the cross-point switch groups 231 and 232 may be manually performed. In this case, by further displaying which of the image data T1 and T2 is currently used, the manipulation can be improved. That is, by manipulating the cross-point switch groups of the bus line which is currently not in use, a desired image data can be texture-mapped at the next switching timing that has been put into the CG description data.

Also, in the first embodiment, the CG production unit 110, the surface designation unit 120, the image generation unit 140, and the image mapping unit 150 exist separately, and are connected together through the network 130. However, a configuration in which they are united may be considered.

Figure 26:
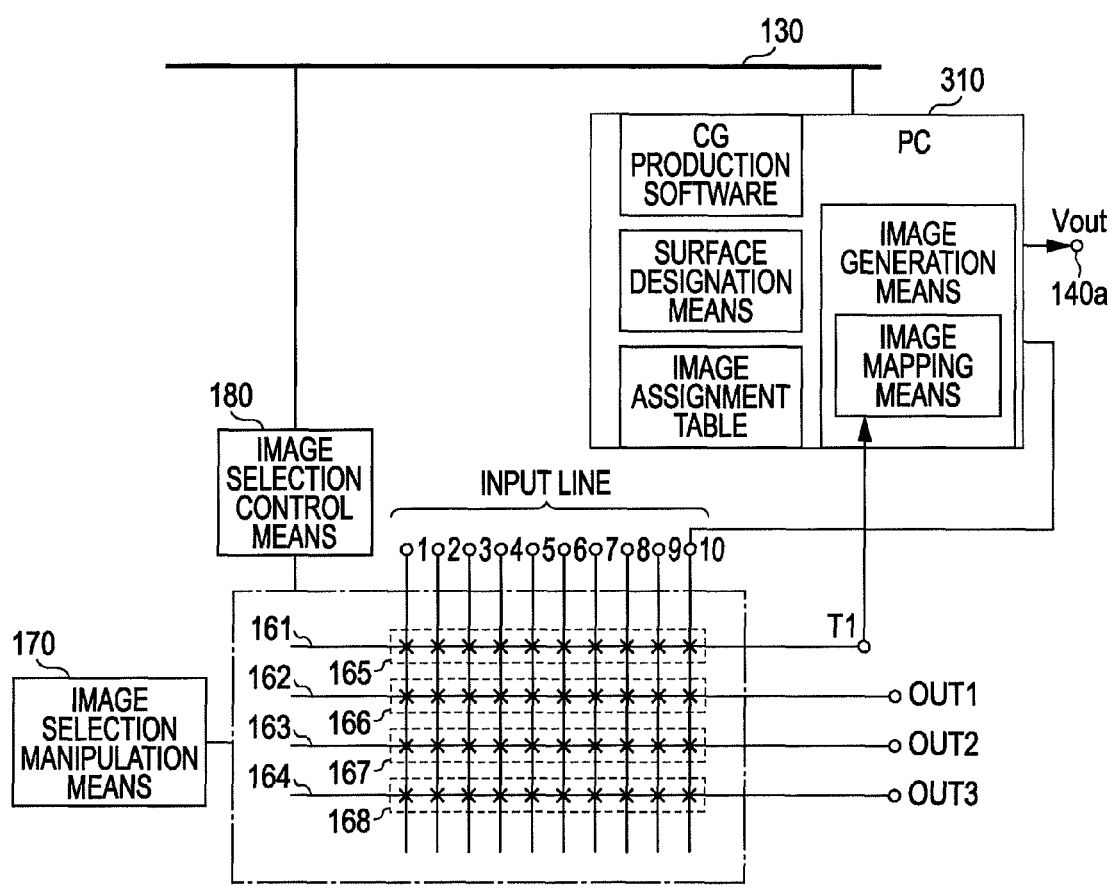
FIG. 26 is a block diagram illustrating a modified example of an image processing apparatus.

FIG. 26 illustrates an image processing apparatus 100C that is obtained by modifying the image processing apparatus 100 as illustrated in FIG. 1. According to the image processing apparatus 100C, a CG production unit, a surface designation unit, an image generation unit, and an image mapping unit are configured into a personal computer 310. Although the detailed explanation has been omitted, other configurations and operations of the image processing apparatus 100C are the same as those of the image processing apparatus 100 as illustrated in FIG. 1.

Also, in the third embodiment, the CG production unit 110, the surface designation unit 120, the image generation unit 140B, and the image mapping unit 150B exist separately, and are connected together through the network 130. However, a configuration in which they are united may be considered.

Figure 27:
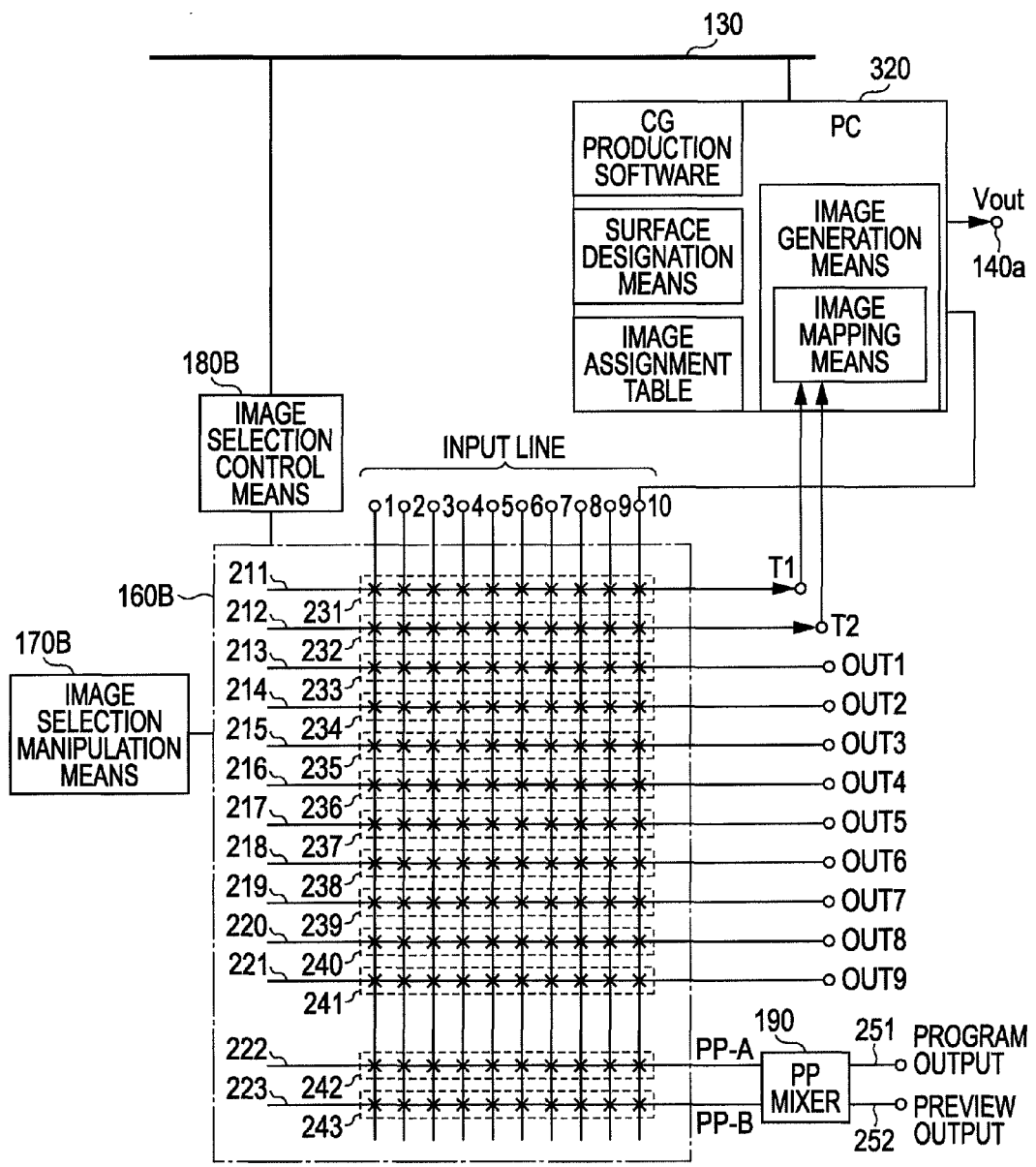
FIG. 27 is a block diagram illustrating a modified example of an image processing apparatus.

FIG. 27 illustrates an image processing apparatus 100D that is obtained by modifying the image processing apparatus 100B as illustrated in FIG. 21. According to the image processing apparatus 100D, a CG production unit, a surface designation unit, an image generation unit, and an image mapping unit are configured into a personal computer 320. Although the detailed explanation has been omitted, other configurations and operations of the image processing apparatus 100D are the same as those of the image processing apparatus 100B as illustrated in FIG. 21.

Although the detailed explanation has been omitted, in the image processing apparatus 100A according to the second embodiment as illustrated in FIG. 16, a configuration in which the CG production unit 110, the surface designation unit 120, the image generation unit 140A, and the image mapping unit 150A are united may be considered.

In the above-described embodiments, color has been designated as an example of a referred attribute. However, even in a configuration that uses an attribute other than the color, the switching of the image data can be introduced during the production of the CG description data. By using the attribute that can be seen by eyes in color or other previews, the result could be easily imagined even in a preview that does not perform the texture mapping.

In an example that uses the table of FIG. 9, it is exemplified that the color range is set to ±1%. In another example, it is also possible that the color space is divided into regions of which the distances to the respective designated colors are near, and even any color value is made to correspond to one image input by making the image input correspond to the region, so that the texture mapped image data is selected.

Also, even in the case where a plurality of sets of the image assignment tables and the image selection unit (cross-point switch groups) is installed and a plurality of texture mapping is performed, merely the number of sets is increased, and thus the embodiment of the present invention can be easily applied thereto.

Also, in addition to the switching of the image data in accordance with the attribute values, it is also possible to make a configuration so that the switching to determine whether to execute the texture mapping operation itself can be performed together. It is also apparent to those of ordinary skill in the art to realize a configuration which performs the texture mapping by selecting the image data in the case where the attribute value coincides with the contents of the image assignment table or is within a predetermined range, and does not perform the texture mapping otherwise. Also, it is easily realized to stop the texture mapping operation or to select and use the appropriate texture mapping according to the use.

The embodiment of the present invention is to make it possible to easily designate the switching timing of an image to be texture-mapped during the CG production in the case of using the produced CG for the operation of live broadcasting, and can be applied to a special effect device and the like.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
an image selection means for selecting one image data from a plurality of input image data;
an image generation means for generating a computer graphics image based on computer graphics description data by a computer graphics production means and compares a value of an attribute that is given to a target of texture mapping among the computer graphics description data with attribute values in an image assignment table;
an image mapping means for determining an object or a portion of the object of the computer graphics drawn by the image generation means as the target of texture mapping and for texture-mapping an image according to the image data selected by the image selection means onto a surface of the target of texture mapping; and
an image selection control means for determining the value of an attribute that is given to the target of texture mapping prior to the computer graphics image for the target being generated and for controlling the image selection means to select the one image data based upon the comparison generated by the image generating means and the value of the attribute being within a predetermined range of the computer graphics description data, wherein the image assignment table indicates a correspondence relationship between respective attribute values given to the target of texture mapping among the computer graphics description data and the image data, wherein a change in the attribute that is given to the target of texture mapping correspondingly changes the image data being texture mapped.

2. The image processing apparatus according to claim 1, further comprising an information setting means for setting a correspondence relationship between a value of the attribute and the image data;

wherein the image selection control means controls the image data selection by the image selection means based on the correspondence relationship set by the information setting means.

3. The image processing apparatus according to claim 1, wherein the attribute is a material definition or surface information on the material definition.

4. The image processing apparatus according to claim 1, wherein the image selection means includes input lines for inputting the plurality of input image data, and a matrix switch provided with an output line for outputting one image data selected from the plurality of input image data; and the image selection means inputs the image data output from the output line to the image mapping means.

5. The image processing apparatus according to claim 1, wherein the image selection means selects one image data from the plurality of input image data input to the image mapping means as the image data that is used in the image mapping means.

6. The image processing apparatus according to claim 1, wherein the image selection means includes input lines for inputting the plurality of input image data and a matrix switch provided with a plurality of output lines for outputting one image data selected from the plurality of input image data; and the image selection means inputs the image data output from the plurality of output lines to the image mapping means, and selects one image data from the plurality of image data input to the image mapping means as the image data that is used in the image mapping means.

7. The image processing apparatus according to claim 1, further comprising an image selection manipulation means for switching the image data selection by the image selection means in accordance with a manipulator's manipulation.

8. An image processing method comprising the steps of:
selecting one image data from a plurality of input image data;
generating a computer graphics image based on computer graphics description data by a computer and compares a value of an attribute that is given to a target of texture mapping among the computer graphics description data with attribute values in an image assignment table;
determining an object or a portion of the object of the computer graphics drawn in the step of generating the image as the target of texture mapping, and texture-mapping an image according to the image data selected in the step of selecting the image onto a surface of the target of texture mapping; and
determining the value of an attribute that is given to the target of texture mapping prior to the computer graphics image for the target being generated and controlling selection of the one image data in the step of selecting the image, based upon the generated comparison and the value of the attribute being within a predetermined range of the computer graphics description data, wherein the image assignment table indicates a correspondence relationship between respective attribute values given to the target of texture mapping among the computer graphics description data and the image data, wherein a change in the attribute that is given to the target of texture mapping correspondingly changes the image data being texture mapped.

9. An image processing apparatus comprising:
an image selection unit selecting one image data from a plurality of input image data;
an image generation unit generating a computer graphics image based on computer graphics description data by a computer graphics production unit and compares a value of an attribute that is given to a target of texture mapping among the computer graphics description data with attribute values in an image assignment table;
an image mapping unit determining an object or a portion of the object of the computer graphics drawn by the image generation unit as the target of texture mapping and texture-mapping an image according to the image data selected by the image selection unit onto a surface of the target of texture mapping; and
an image selection control unit determining the value of an attribute that is given to the target of texture mapping prior to the computer graphics image for the target being generated and controlling the image selection unit to select the one image data based upon the comparison generated by the image generating unit and the value of the attribute being within a predetermined range of the computer graphics description data, wherein the image assignment table indicates a correspondence relationship between respective attribute values given to the target of texture mapping among the computer graphics description data and the image data, wherein a change in the attribute that is given to the target of texture mapping correspondingly changes the image data being texture mapped.

* * * * *